United States Patent
Gopal et al.

(10) Patent No.: US 11,616,544 B2
(45) Date of Patent: Mar. 28, 2023

(54) ANTENNA MANAGEMENT IN DUAL CONNECTIVITY

(71) Applicant: QUALCOMM Incorporated, San Diego, CA (US)

(72) Inventors: Thawatt Gopal, San Diego, CA (US); Brian George, San Diego, CA (US); Vishal Mahajan, Dublin, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/301,608

(22) Filed: Apr. 8, 2021

(65) Prior Publication Data

US 2021/0320697 A1 Oct. 14, 2021

Related U.S. Application Data

(60) Provisional application No. 63/007,912, filed on Apr. 9, 2020.

(51) Int. Cl.
*H04B 7/02* (2018.01)
*H04B 7/06* (2006.01)

(52) U.S. Cl.
CPC .................. *H04B 7/0608* (2013.01)

(58) Field of Classification Search
CPC ...................................... H04B 7/0608

USPC ........ 375/267, 261, 260, 259, 219, 316, 295
See application file for complete search history.

(56) References Cited

U.S. PATENT DOCUMENTS

| 10,291,310 B1 | 5/2019 | Gopal et al. |
| 2011/0250926 A1 | 10/2011 | Wietfeldt et al. |
| 2018/0048336 A1* | 2/2018 | Oshita .................. H04B 7/0825 |
| 2018/0083664 A1* | 3/2018 | Clevorn .................. H04B 1/44 |
| 2018/0331714 A1 | 11/2018 | See et al. |
| 2020/0045762 A1* | 2/2020 | Raghuram ............ H04W 76/15 |

OTHER PUBLICATIONS

International Search Report and Written Opinion—PCT/US2021/026697—ISAEPO—dated Jul. 2, 2021.

* cited by examiner

*Primary Examiner* — Zewdu A Kassa
(74) *Attorney, Agent, or Firm* — Dalei Dong; ArentFox Schiff LLP

(57) ABSTRACT

An apparatus may operate in a dual connectivity mode in which the apparatus is simultaneously connected to carriers of different radio access technologies. The apparatus may operate via a first antenna set of a plurality of antenna sets, the first antenna set including a first communication path. The apparatus may determine to operate via a second antenna set of the plurality of antenna sets based on whether one or more criteria is satisfied. The apparatus may select at least one second communication path for the second antenna set based on the one or more criteria. The apparatus may operate via the second antenna set over the at least one second communication path when the criteria is satisfied.

30 Claims, 12 Drawing Sheets

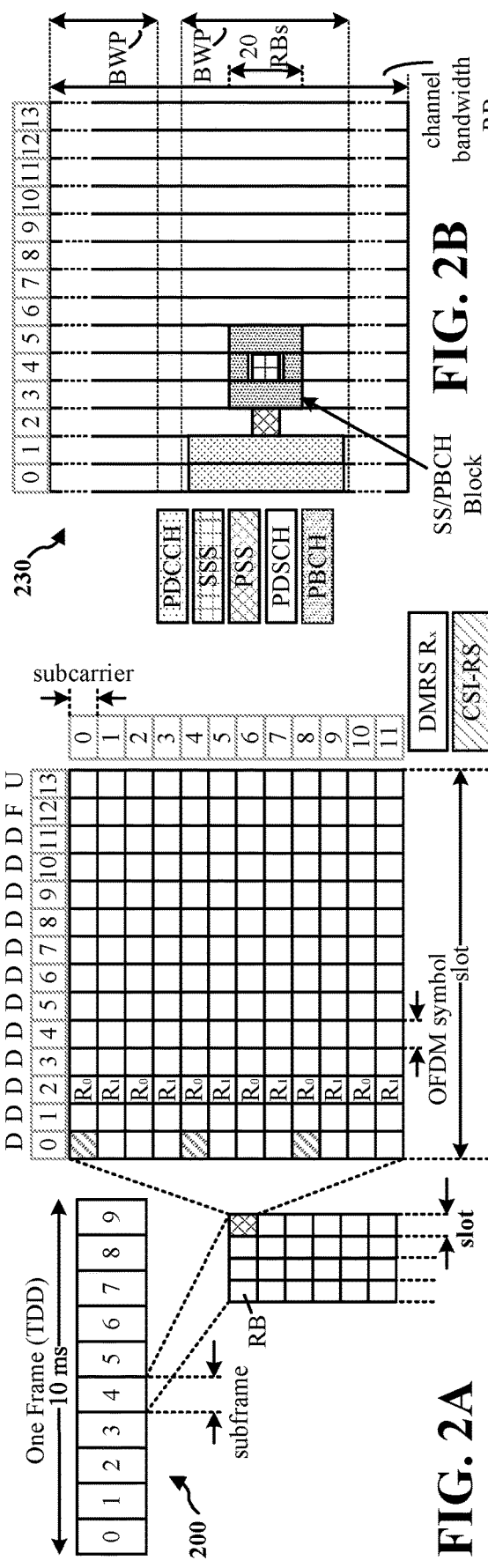
FIG. 2A
FIG. 2B
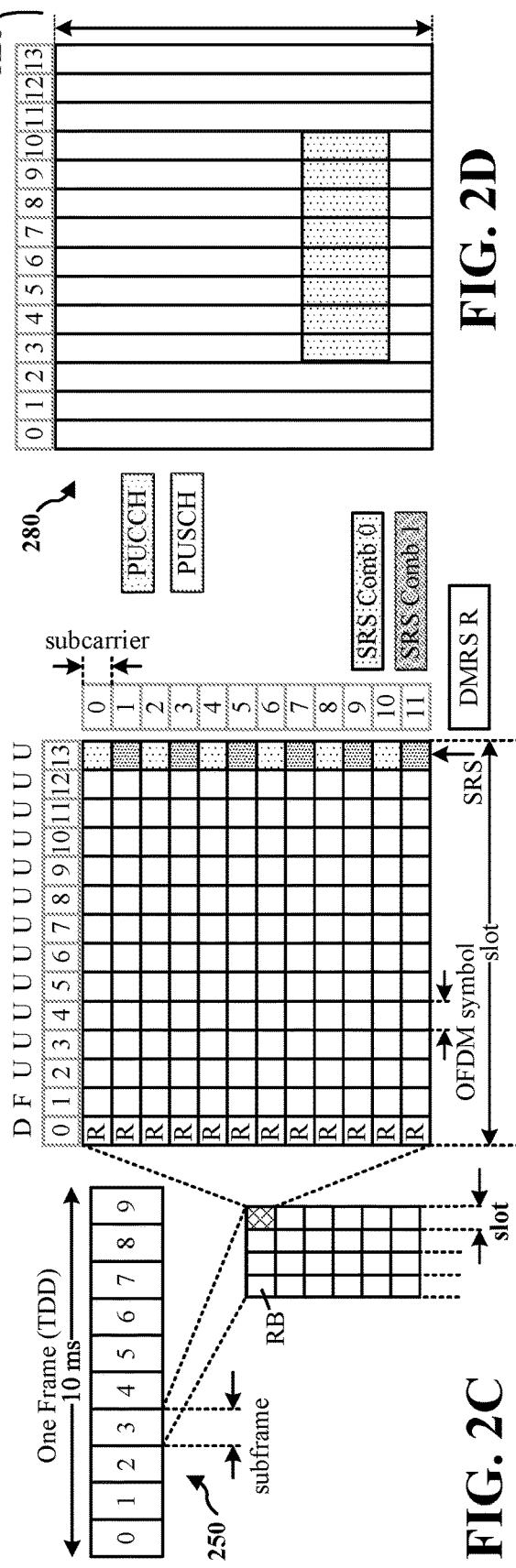
FIG. 2C
FIG. 2D

ANTENNA MANAGEMENT IN DUAL CONNECTIVITY

CROSS REFERENCE TO RELATED APPLICATION(S)

This application claims the benefit of U.S. Provisional Application Ser. No. 63/007,912, entitled "METHODS AND APPARATUS FOR MANAGEMENT OF ANTENNA SWITCHING" and filed on Apr. 9, 2020, the disclosure of which is expressly incorporated by reference herein in its entirety.

BACKGROUND

Technical Field

The present disclosure generally relates to communication systems, and more particularly, to configuration and management of antennas by user equipment and other devices in antenna switching procedures.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some example wireless and radio access networks, antenna switching may be enabled for some pilot signals to improve throughput performance. In a 5G New Radio (NR) access network, for example, antenna switching may be enabled for sounding reference signal (SRS) transmission, in which a user equipment (UE) sounds over different bands of the spectrum to facilitate channel quality estimation. Communication with the UE, however, may be configured with multiple layers, as with downlink multiple-input multiple-output (MIMO) technology, and sounding over one layer may be inefficient or unsatisfactory.

With SRS antenna switching, a UE can switch an active antenna with which to transmit SRS on an uplink data or shared channel (e.g., the physical uplink link shared channel (PUSCH)) to each of a set of antennas, some or all of which may be configured on a receive (RX) radio carrier of an absolute radio-frequency channel number (ARFCN). When the UE sounds multiple antennas, the base station may perform some channel estimation and/or may more accurately configure precoding for multi-layer precoding and/or other MIMO configurations.

Some UEs may be configured to operate with dual connectivity, in which the UE may be simultaneously connected with more than one base station to communicate on multiple component carriers (CCs), e.g., of multiple radio access technologies (RATs). In implementation, a UE may include an antenna cross-switch to share antennas among multiple carriers. For example, antennas may be shared between Long Term Evolution (LTE) and 5G NR RATs. Where circuitry for each of the RATs is involved in antenna switching contemporaneously, however, the switching procedures may cause some interruptions to the transmit (TX) and/or RX chains of at least one of those chains. Such interruptions may lead to irrecoverable signal loss on at least one of the carriers, as well as potentially causing link failure on one or more of the carriers. Thus, a need exists for antenna switching schemes that either prevent or reduce prevent or reduce interruptions on carriers when a UE is operating with dual connectivity.

The present disclosure describes various mechanisms and solutions for antenna switching diversity in dual connectivity modes of operation, which may be beneficial to UEs operating with dual connectivity. According to the concepts and various aspects described herein, an antenna switching diversity algorithm of one carrier may be configured to coexist or contemporaneously execute with an antenna switching algorithm of another carrier. Such coexistence or contemporaneous execution may occur without transmission or reception interruption to the one carrier while the carrier sounds antennas of the UE.

In an aspect of the disclosure, a method, a computer-readable medium, and an apparatus are provided. The apparatus may be a UE or a component thereof. The apparatus may operate via a first antenna set of a plurality of antenna sets, the first antenna set including a first communication path. The apparatus may further determine to operate via a second antenna set of the plurality of antenna sets based on whether a transmit antenna switch diversity (ASDiv) criteria is satisfied. The apparatus may further determine whether the transmit ASDiv criteria is satisfied. Further, the apparatus may measure a communication blockage of at least one of the first antenna set or the second antenna set. The apparatus may further adjust the transmit ASDiv criteria based on the communication blockage of at least one of the first antenna set or the second antenna set. Additionally, the apparatus may select at least one second communication path for the second antenna set based on at least one of a SRS interruption, a front end path loss, or a path having cascaded cross-switches. The apparatus may further configure the at least one second communication path based on at least one of the SRS interruption, the front end path loss, or the path having cascaded cross-switches. The apparatus may further operate via the second antenna set over the at least one second communication path when the transmit ASDiv criteria is satisfied. The apparatus may further maintain operation via the first antenna set over the first communication path when the transmit ASDiv criteria is not satisfied.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
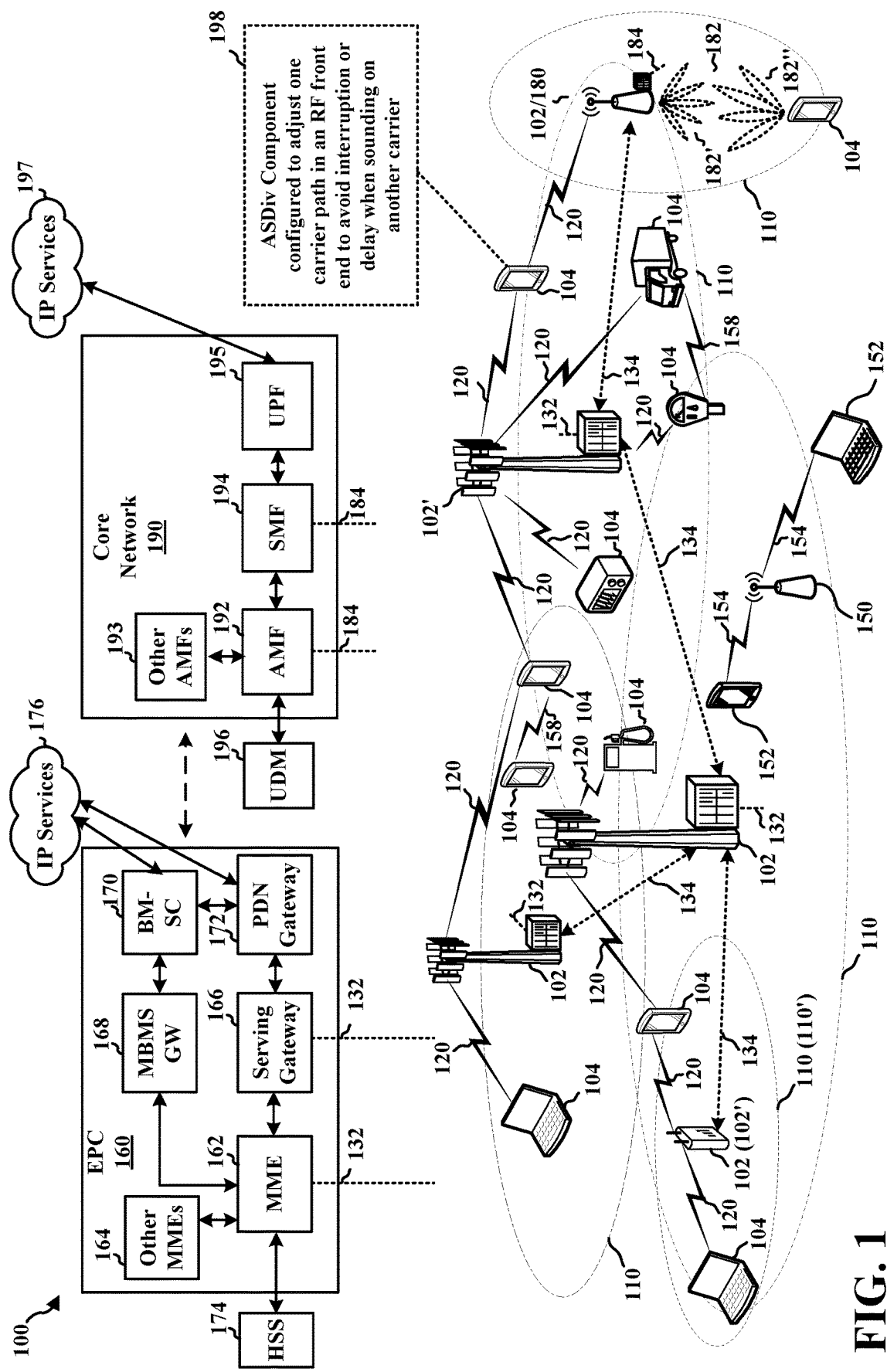
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In various aspects of the present disclosure, user equipment (UE) may be configured for dual connectivity on multiple carriers, which may be implemented as one or more operating modes for multiple radio access technologies (RATs) dual connectivity (MRDC). MRDC may include modes of Evolved Universal Mobile Telecommunications System (UMTS) Terrestrial Radio Access Network (E-UTRAN) New Radio (NR) dual connectivity (ENDC), which may involve operation on a Long Term Evolution (LTE) carrier via a primary cell (PCell) of a master cell group (MCG)) and an NR carrier via a primary secondary cell (PSCell) of a secondary cell group (SCG). Example carriers for some LTE and NR ENDC configurations include a frequency-division duplexed (FDD) LTE carrier and a time-division duplexed (TDD) NR carrier (FDD+TDD), a TDD LTE carrier and a TDD NR carrier (TDD+TDD) (e.g., for synchronous and asynchronous networks topologies), an FDD LTE carrier and an FDD NR carrier (FDD+FDD), and a TDD LTE carrier and a FDD NR carrier (TDD+FDD).

Although the present disclosure may focus on 5G NR and LTE, specifically in the context of ENDC, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. To that end, the concepts and various aspects described herein may be applicable to other instances of dual connectivity apart from ENDC.

In some MRDC configurations, such as those in which one carrier is within NR sub-6 gigahertz (GHz) frequency band (NRsub6) and/or frequency range 1 (FR1), antenna switching may be utilized for sounding, which includes sounding reference signal (SRS) transmission with antenna (s). For example, antenna switching may be configured for systems and devices as one transmit (TX) with two receive (RX) antenna switching (1T2R) or one TX with four RX antenna switching (1T4R), e.g., according to which a UE may transmit one or more SRS resource sets. In some other examples, systems and devices with UL multiple-input and multiple-output (MIMO) configured in NRsub6 (or FR1) may implement SRS antenna switching as two TX and four RX antennas (2T4R). Similarly, when a UE is operating on an LTE carrier, antenna switching may be implemented as one TX with two RX antenna switching (1T2R) or one TX with four RX antenna switching (1T4R). Other configurations of TX with RX antenna switching are possible without departing from the scope of the present disclosure, such as implementations in which the TX number is equal to the RX number and the number of TX chains is equal to the number of RX antennas.

MRDC carriers may be either TDD or FDD, with channel reciprocity being maintained (at least to some degree) on TDD carriers by virtue of the downlink (DL) and uplink (UL) channels being on the same frequency. Therefore, some measurements and/or channel estimates from signaling on the UL, such as SRS, may be applied on the DL, as well. Accordingly, SRS antenna switching on TDD bands may be utilized in connection with DL MIMO enhancements, such as precoding. When a UE is configured for ENDC with FDD+TDD carriers, the UE may sound antennas using carrier-based SRS antenna switching in which the DL/UL of the NR carrier is configured on an FDD PSCell, while DL is configured on a TDD secondary cell (SCell). A UE configured with carrier-based SRS antenna switching may pause the FDD PSCell DL/UL to switch to the TDD SCell for SRS transmission on the TDD carrier.

In addition, SRS may be used to sound over different portions of the frequency spectrum on which uplink channels and/or resource blocks (RBs) are not configured. For example, SRS transmission may be used to sound in a spectrum having no physical uplink shared channel (PUSCH), e.g., for channel quality estimation. A UE with SRS antenna switching capabilities may assign one antenna otherwise used for RX as a PUSCH TX antennas otherwise used for RX in a current operating absolute frequency channel number (ARFCN).

When UL MIMO is configured on LTE and NR carriers, the NR UL MIMO may be 2×2 and the DL MIMO may be 4×4. Illustratively, antenna switching for UL/DL MIMO SRS transmission on the NR carrier may be implemented as 2T4R when ENDC includes an LTE TDD carrier. In some other examples, a UE with ENDC may be configured with 1T4R on an LTE carrier, and 2T4R on an NR carrier so that SRS transmission on the NR carrier may be 2T4R. Further to the preceding, a UE having ENDC may be configured with carrier aggregation in at least one of an LTE carrier and/or NR carrier, e.g., in which antenna switching may be 1T4R on each of a PCell and SCell of an LTE carrier, and 2T4R for a PSCell of the NR carrier but 1T4R for an SCell of the NR carrier. Accordingly, the UE may sound with 2T4R antenna switching in the PSCell of the NR carrier, but with 1T4R antenna switching in the SCell of the NR carrier.

SRS transmission may be periodic via explicit or implicit instructions (e.g., downlink control information (DCI) received by a UE), and/or semi-statically configured via RRC signaling, e.g., with a periodicity of 1, 2, 4, 5, 8, 10, 16, 20, 32, 40, 64, 80, 160, 320, 640, 1280, or 2560 slot(s). Another SRS configuration can be aperiodic, which includes dynamic via grant (DCI 1_1 and DCI 0_1). Potentially, SRS transmission may be semi-persistent such that SRS transmission at configured periodicities is activated (as well as deactivated) via a media access control (MAC) control element (CE).

The band(s) over which a UE sounds may be contingent upon UE capability that indicates a supported band combination, such that SRS transmission may be configured per ENDC band combination according to that which is supported by the UE. In some aspects, this ENDC band combination may depend on UE support for SRS antenna switching, e.g., including the type of antenna switching. For example, a UE may transmit a UE capability message that indicates a set of supported antenna switching types according to an enumerated list. For example, a field of a UE capability messaged may be labeled similar to supported-SRS-TXPortSwitch, which may be enumerated with {t1r2, t1r4, t2r4, t1r4-t2r4, t1r1, t2r2, t4r4, notSupported}, such that each entry corresponds to a band and/or band combination.

A UE capability message may further indicate an impact of SRS antenna switching in an UL band for some or all band combinations. For example, a field may indicate whether antenna switching in an UL band of a band combination has an impact on a corresponding DL band—e.g., a field labeled txSwitchImpactToRX may include a set of integer entries corresponding to UL bands in band combinations with binary information indicating either "impact" or "no impact." Similarly, a UE capability message may further indicate an UL band for some or all band combinations. For example, a field may indicate whether a band of a band combination switches together with an UL band—e.g., a field labeled txSwitchWithAnotherBand may include a set of integer entries corresponding to bands in band combinations with binary information indicating either "switches with this UL" or "does not switch with this UL."

A UE may be configured with a radio frequency (RF) front end including multiple antennas that are shared across multiple carriers of multiple RATs. For example, an RF front end of a UE may include four, five, six, or more antennas shared for communication on LTE carriers and NR carriers. Accordingly, antenna cross-switches may also be shared. As some UEs include an inadequate number of TX chains to sound all RX antennas with SRS, such cross-switches may enable switching a TX chain between multiple RX antennas for SRS transmission.

When the UE implements some antenna switching diversity, however, antenna switching for SRS transmission may temporarily induce an outage or interruption in at least a portion of a carrier for each RAT. For example, a UE having ENDC configured on a band combination of TDD+TDD (e.g., in which the LTE carrier and the NR carrier are each TDD), such as a band combination of B39+N41, antenna switching may cause an outage to the LTE and NR carriers on the UL (e.g., as an effect of ENDC synchronization). A UE having ENDC configured on a band combination of FDD+TDD (e.g., in which the LTE carrier is FDD and the NR carrier is TDD), such as a band combination of B3+N41, antenna switching may cause an outage to the LTE carrier on both the UL and DL, and may cause an outage to the NR carrier on the UL. In particular, antenna switching for NR SRS transmission may involve a delay impact on an LTE carrier when antenna switching diversity is used thereon. Illustratively, an NR SRS switch from 0 to 1 may take 5 to 10 microseconds ($\mu$s), while an SRS switch from 1 to 0 may take 5 to 10 $\mu$s, which may be experienced as outages on the LTE carrier (at least on the UL). Coupled with the NR SRS symbol duration of 35.71 $\mu$s in a TDD carrier with 30 kHz sub-carrier spacing (SCS), a UE experience outages on the LTE carrier of approximately 45.7 $\mu$s to 55.71 $\mu$s.

At least some of the outages or interruptions caused by SRS antenna switching may be a consequence of RF front end and/or antenna cross-switch architecture and design, e.g., including the total number of antennas used by each carrier, such as 4RX antennas configured for the LTE carrier or 2RX antennas configured for an NR carrier. Specifically, antenna switching diversity (ASDiv) may cause or contribute to some outages or interruptions, such as TX antenna selection on an LTE carrier for ASDiv in ENDC band combinations including a TDD or FDD LTE carrier with a TDD NR carrier.

Such outages or interruptions resulting from sharing RF front end cross-switches and antennas between LTE and NR carriers for ENDC may result in signal loss on the UL and/or DL for the LTE carrier (that is, the carrier over which the UE is not currently sounding over). Consequently, errors will increase, e.g., according to the block error rate (BLER), and the radio link on the LTE carrier will suffer, potentially to the point of radio link failure on the LTE carrier, which may cause radio link failure on the NR carrier, as well, due to the ENDC relationship of the NR carrier with the LTE carrier.

The present disclosure describes various techniques and solutions for avoiding or reducing outages and interruptions attributable to SRS antenna switching on one carrier while antenna switching diversity is being used on another carrier in ENDC. For example, a UE operating with ENDC may be configured with some components (e.g., chips, circuits, etc.) and/or instructions (e.g., computer-executable code for performing an algorithm) for TX ASDiv on an LTE carrier, e.g., in addition to SRS antenna switching on an NR carrier. In some examples, a UE may select a TX antenna from among antennas located on one side of the UE and those located on another side of the UE, such as antennas more proximate to the one side (e.g., a top side) and those antennas more proximate to the other side (e.g., a bottom side) of the UE. The UE may transition between antennas positioned at the one side and antennas positioned at the other side based on information regarding which antennas are positioned on the one side and which are positioned on the other side. Further, the UE may transition an RF front end having functionality for two RATs (e.g., LTE and NR) between multiple TX ASDiv configurations.

For convenience and clarity, the various concepts and aspects described herein may refer to one side as the "top" and another side as the "bottom." However, one of ordinary skill in the relevant art will readily appreciate that the concepts and aspects described herein may be practiced by any device having at least two collocated antennas that are positioned on different sides of the device, such as with two antenna panels positioned on two oppositely facing and approximately parallel sides of a UE.

According to some aspects of the present disclosure, a UE may identify and select one or more front end paths of the same RAT, which may avoid TX and RX interruption or blanking on one carrier of one RAT (e.g., LTE carrier) when sounding over (at least a portion of) the other carrier of the other RAT (e.g., NR carrier) with antenna switching, while still allowing for antenna switching diversity on the one RAT. For instance, the UE may search across multiple (or even all possible) RF front end paths supported for the dual connectivity RF band combination. In so doing, the UE may identify the shortest RF front end path from RF transceiver to antenna cross-switches, e.g., on which the UE may configure an RF path (e.g., TX path or RX path) for the one RAT. Potentially, this may involve hopping the RF chain across different possible RF front end paths to determine how to avoid cascaded cross-switching, as a path with only a single cross-switch may be preferable.

Where a carrier of one RAT is FDD (e.g., FDD LTE carrier), some or all RF paths established from a software-defined radio (SDR) to one or more cross-switches may remain unchanged. Rather, the UE may adjust (e.g., program, control, etc.) one or more antenna cross-switches to route TX and RX RF front end paths to different antennas, which may incur additional front end losses when the signal traverses cascaded cross-switches (e.g., attributable to loss from additional insertion, co-axial cable, etc.).

In some aspects of the present disclosure, a UE as described herein may search for RF front end paths between SDR and antenna cross-switches that were not used in a prior ASDiv configuration, such as TX antenna at the bottom of the device/UE, when evaluating RF front end paths to move TX antenna to the top of the device/UE. For example, a UE may contemporaneously (or simultaneously) reconfigure two or more RF front end analog paths (e.g., RF front end analog paths for LTE and 5G NR RATs) using a joint re-tune procedure to make use of the new configuration. In some aspects, the UE also can apply such a procedure when one carrier (e.g., LTE) is on an FDD RF band and another carrier (e.g., 5G NR) is on a TDD RF band in ENDC mode.

A front end path may be subdivided into sub-paths to an antenna cross-switch and from the antenna cross-switch. For example, a UE may determine an RF front end path (either TX or RX path) from an output of a radio transceiver to at least one input of at least one antenna cross-switch (or vice versa) as a first part (or sub-path) of an RF analog front end path. Similarly, the UE may determine an output of an antenna cross-switch to an input of a physical antenna as a second part (or sub-path) of the RF analog front end path. In addition to such front end paths, the UE may identify a current or active antenna configuration, such as a current TX antenna configuration for the carrier of one RAT (e.g., LTE TX antenna configuration). The UE may determine an antenna configuration or location with respect to the device form factor, such as by determining that an antenna is on a panel at the bottom of the UE or at the top of the UE. For example, the UE may group antennas (e.g., by antenna identifier (ID)) according to which side of the UE the antenna is most proximate (e.g., on a panel at the bottom of the UE or at the top of the UE).

As described herein, the UE may evaluate some criteria associated with the ASDiv operations, upon which switching TX antennas between those proximate to one side and those proximate to another side is predicated. For example, the UE may evaluate RF front end paths (e.g., at a sub-path level) to identify a RF front end path with which the UE may reduce or minimize front end losses for an RX chain (e.g., on an LTE carrier). The UE may select and prioritize front end paths having the fewest number of cascaded cross-switches. For example, the UE may avoid front end paths that include more than one cross-switch (or more than one cross-switch per sub-path). Specifically, the UE may prioritize direct paths from a radio transceiver to a physical antenna via one or more cross-switches, such as front end paths that do not include any cascaded cross-switches. In another example of such criteria, a UE may evaluate selection of a TX chain associated with SRS antenna switching on one carrier (e.g., NR carrier) for effects causing interruptions or blanking to signals on the other carrier (e.g., LTE TX signal). The UE may select the TX chain that reduces or minimizes the unintentional interruptions or blanking on the other carrier.

Potentially, a UE may find the aforementioned criteria to be fulfilled where a front end path having less than a threshold number of cascaded cross-switches is identified (e.g., the threshold may specify that the number of cascaded switches be less than two or less than one) is identified, and/or where a TX chain does not cause interruption or blanking on one carrier (e.g., LTE carrier) when used for sounding (e.g., SRS transmission) on the other carrier (e.g., NR carrier). In some aspects, a UE may determine that a current RF antenna configuration (either TX or RX) on one carrier (e.g., LTE carrier) may be reconfigured from one side to another side of the UE—e.g., such that communication via antennas at one side will instead occur via antennas at the other side. Additionally or alternatively, the UE may jointly reconfigure or retune two or more sub-paths of one or more RF front end paths in order to avoid or reduce interruptions or blanking on one carrier (e.g., LTE carrier) due to SRS transmission and antenna switching on the other carrier (e.g., NR carrier). For example, the RF front end analog paths of RX and/or TX chains on the LTE carrier and the RX and/or TX paths on the NR carrier may be jointly reconfigured or retuned, which may allow the TX chain of one carrier (e.g., LTE carrier) to be transitioned onto a TX antenna ASDiv configuration, e.g., in order to avoid interruptions or blanking caused by the other carrier (e.g., NR carrier).

According to some other aspects, a UE may find the aforementioned criteria to be fulfilled where a TX chain does not cause interruption or blanking on one carrier (e.g., LTE carrier) when used for sounding (e.g., SRS transmission) on the other carrier (e.g., NR carrier) and/or where the UE selects an RF front end path having the lowest path loss relative to other front end paths for a TX chain of one carrier (e.g., LTE carrier). Additionally or alternatively, the UE may identify some or all RF (e.g., TX and/or RX) paths that avoid or reduce interruptions or blanking caused by the other carrier (e.g., NR carrier). The UE may identify such RF paths using information specifying some or all possible paths (e.g., hardware paths) between RF transceiver and antenna cross-switch, and potentially, between antenna cross-switch and antenna. In some aspects, the UE may refrain from selecting any RF paths that include at least one cascaded cross-switch.

Particular implementations of the subject matter described in this disclosure can be implemented to realize one or more of the following potential advantages. For instance, the subject matter described in this disclosure may be implemented to improve communication signaling, improve resource utilization, or improve power savings. Additionally, aspects of the present disclosure may reduce or eliminate TX and RX interruption or blanking due to SRS antenna switching. Aspects of the present disclosure may further reduce or eliminate radio link failure, such as radio link failure on an LTE radio link or radio link failure on a SCG or NR radio link.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as E-UTRAN) may interface with the EPC 160 through first backhaul links 132 (e.g., S1 interface). The base stations 102 configured for 5G NR, which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz, with x component carriers (CCs) used for transmission in each direction. The carriers may or may not be adjacent to each other. Allocation of carriers may be asymmetric with respect to downlink and uplink (e.g., more or fewer carriers may be allocated for downlink than for uplink). The CCs may include a primary CC and one or more secondary CCs. A primary CC may be referred to as a PCell and a secondary CC may be referred to as an SCell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an ASDiv component 198 configured to operate via a first antenna set of a plurality of antenna sets, the first antenna set including a first communication path. The ASDiv component 198 may further be configured to determine to operate via a second antenna set of the plurality of antenna sets based on whether transmit ASDiv criteria is satisfied. The ASDiv component 198 may further be configured to determine whether the transmit ASDiv criteria is satisfied. The ASDiv component 198 may further be configured to measure a communication blockage of at least one of the first antenna set or the second antenna set. The ASDiv component 198 may further be configured to adjust the transmit ASDiv criteria based on the communication blockage of at least one of the first antenna set or the second antenna set.

The ASDiv component 198 may further be configured to configure the at least one second communication path based on at least one of the SRS interruption, the front end path loss, or the path having cascaded cross-switches. The ASDiv component 198 may further be configured to select at least one second communication path for the second antenna set based on at least one of a SRS interruption, a front end path loss, or a path having cascaded cross-switches. The ASDiv component 198 may further be configured to operate via the second antenna set over the at least one second communication path when the transmit ASDiv criteria is satisfied. The ASDiv component 198 may further be configured to maintain operation via the first antenna set over the first communication path when the transmit ASDiv criteria is not satisfied.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be FDD in which for a particular set of subcarriers (carrier system bandwidth), subframes within the set of subcarriers are dedicated for either downlink or uplink, or may be TDD in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP)

orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 microseconds (µs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
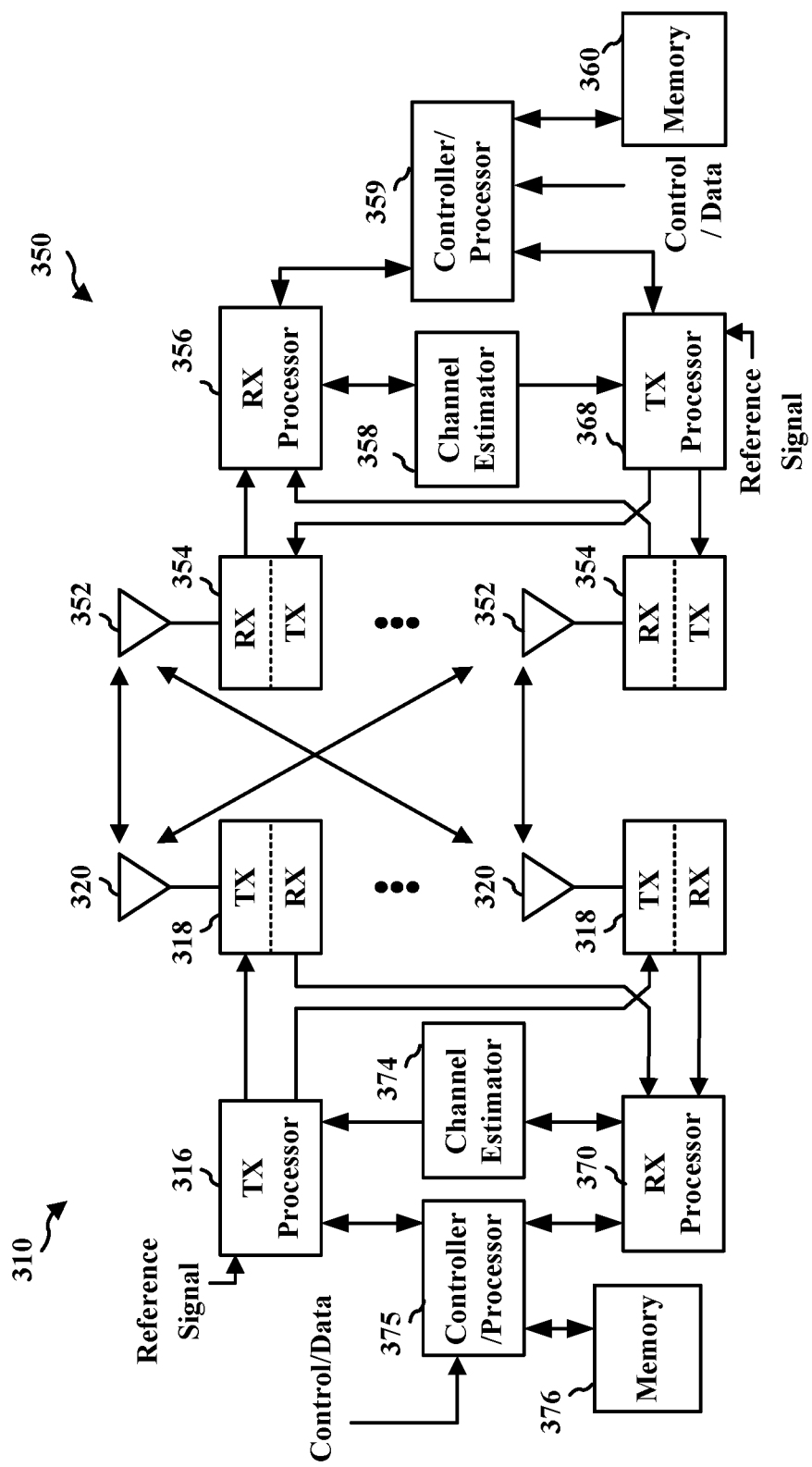
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the ASDiv component 198 of FIG. 1.

Figure 4:
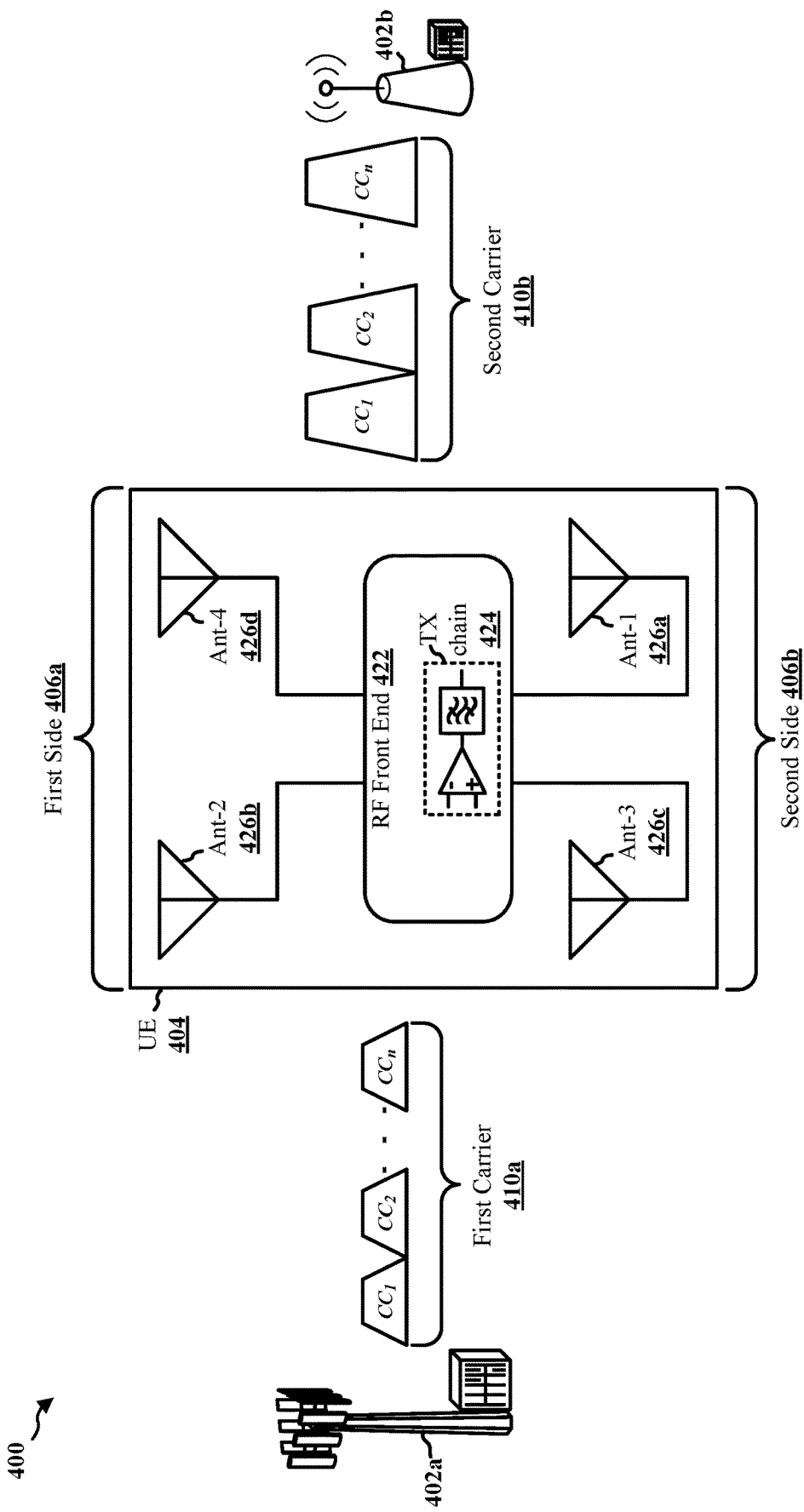
FIG. 4 is a diagram illustrating an example UE that may set an antenna configuration when having dual connectivity with a first carrier and a second carrier.

FIG. 4 is a diagram 400 illustrating an example of a UE 404 that may determine an antenna configuration when having dual connectivity with a first carrier 410a and a second carrier 410b. The first carrier 410a may be an LTE carrier, which may be accessed via a first base station 402a, such as an eNB. The second carrier 410b may be an NR carrier, which may be accessed via a second base station 402b, such as an gNB.

The UE 404 includes an RF front end 422 the provides paths to multiple antennas 426a-d. The antennas 426a-d may be positioned at different locations of the UE 404, e.g., in order to increase the likelihood of receiving signaling the UE 404 is able to decode. For example, two antennas 426a, 426c may be positioned relatively closer to a second side 406b (e.g., a "bottom" side, bottom face, bottom surface, etc.) of the UE 404, whereas two other antennas 426b, 426d may be positioned relatively closer to a first side 406a (e.g., a "top" side, top face, top surface, etc.) of the UE 404.

According to aspects described herein, the UE 404 may be configured for dual connectivity on multiple carriers, which may be implemented as MRDC, and ENDC specifically. Thus, the UE 404 may operate an first carrier 410a (e.g., LTE carrier) via a PCell of an MCG, provided by the first base station 402a, and the UE 404 may operate on a second carrier 410b (e.g., NR carrier) via a PSCell of an SCG, provided by the second base station 402b. Then antennas 426a-d may be shared across the two carriers 410a-b.

However, the number of TX chains for at least the second carrier 410b may be less than the number of antennas available to receive signaling on the second carrier 410b. Accordingly, the UE 404 may be configured for antenna switching when sounding the antennas 426a-d.

In particular, the UE 404 may sound each of the antenna 426a-d using antenna switching to transmit SRS from each of the antennas 426a-d. By way of illustration and not limitation, the UE 404 may include four antennas 426a-d to sound; however, the UE 404 may include only one TX chain 424, and so may implement 1T4R antenna switching. This antenna switching configuration is only one possible antenna switching configuration, and other configurations of antenna switching are possible without departing from the scope of the present disclosure, such as implementations in which the number of TX chains is greater than one, the number of TX chains is equal to the number of RX antennas, the number of antennas is greater than or less than four (e.g., 1T2R, 1T6R, 2T8R, etc.).

In some configurations, the UE 404 may sound the antennas 426a-d where the second carrier 410b is TDD, and in some instances, where the first carrier 410a is FDD. The UE 404 may sound antennas 426a-d using carrier-based SRS antenna switching in which the DL/UL of the second carrier 410b where at least the DL on the second carrier 410b is TDD. The UE 404 configured with carrier-based SRS antenna switching may pause the FDD PSCell DL/UL to switch to the TDD SCell for SRS transmission on the TDD carrier.

However, antenna switching for SRS transmission may temporarily induce an outage or interruption at one or more antennas 426a-d being used for antenna switching diversity. One example of this relationship is evident where the UE 404 is configured with ENDC on a band combination of FDD+TDD for the first carrier and the second carrier, respectively (e.g., in which the LTE carrier is FDD and the NR carrier is TDD). In practical effect, outages or interruption on the first carrier due to SRS antenna switching on the second carrier is evident from the FDD+TDD band combination of B3+N41, which includes an UL band of 2500-2570 MHz and a DL band of 2620-2690 MHz on B3 and the band of 2496-2690 MHz for both UL and DL on N41. When ENDC for the UE 404 is configured on this band combination, or a similar FDD+TDD band combination, the UE 404 may experience outages on the first carrier 410a (e.g., LTE carrier) on both the UL and DL, and further, may experience outages on the second carrier 410b (e.g., NR carrier) on the UL due to some SRS antenna switching. Such an outage may negatively impact performance of the UE 404, as well as user experience, as delay and latency inherently contribute to increased overhead and increased BLER.

At least some of the outages or interruptions caused by SRS antenna switching may be a consequence of RF front end 422 and/or antenna cross-switch architecture and design, e.g., including the total number of antennas used by each carrier, such as 4RX antennas shared between the first and second carriers 410a-b. Specifically, ASDiv may cause or contribute to some outages or interruptions, such as RF antenna selection on the first carrier 410a for ASDiv.

Such outages or interruptions resulting from sharing cross-switches of the RF front end 422 and antennas 426a-d between first and second carriers 410a-b for ENDC may result in signal loss on the UL and/or DL for the first carrier 410a, in particular when the UE 404 is sounding antennas 426a-d with SRS transmission on resources of the second carrier 410b.

In view of the foregoing, the UE 404 may be configured to reduce or avoid outages and interruptions attributable to SRS antenna switching conflicts with partial in ENDC. For example, the UE 404, operating with ENDC, may be configured with some components (e.g., chips, circuits, etc.) and/or instructions (e.g., computer-executable code for performing an algorithm) for ASDiv on the first carrier 410a, e.g., in addition to SRS antenna switching on the second carrier 410b. In some examples, the UE 404 may select one of the antenna 426a-d (e.g., a TX antenna) from among those located on a first side 406a (e.g., upper or top side) of the UE 404 and those located on a second side 406b (e.g., lower or bottom side), such as antennas more proximate to the one side (e.g., a top side) and those antennas more proximate to the other side (e.g., a bottom side) of the UE. The UE may transition between Antenna (Ant-) 2 426b and Ant-4 426b, positioned proximate to the first side 406a, and Ant-1 426a and Ant 426c, positioned proximate to the second side 406b, based on information regarding which antennas are positioned proximate to which side. Further, the UE 404 may transition an RF front end 422 having dual connectivity on first and second carriers 410a-b between multiple TX ASDiv configurations in order to find one suitable.

Figure 5A:
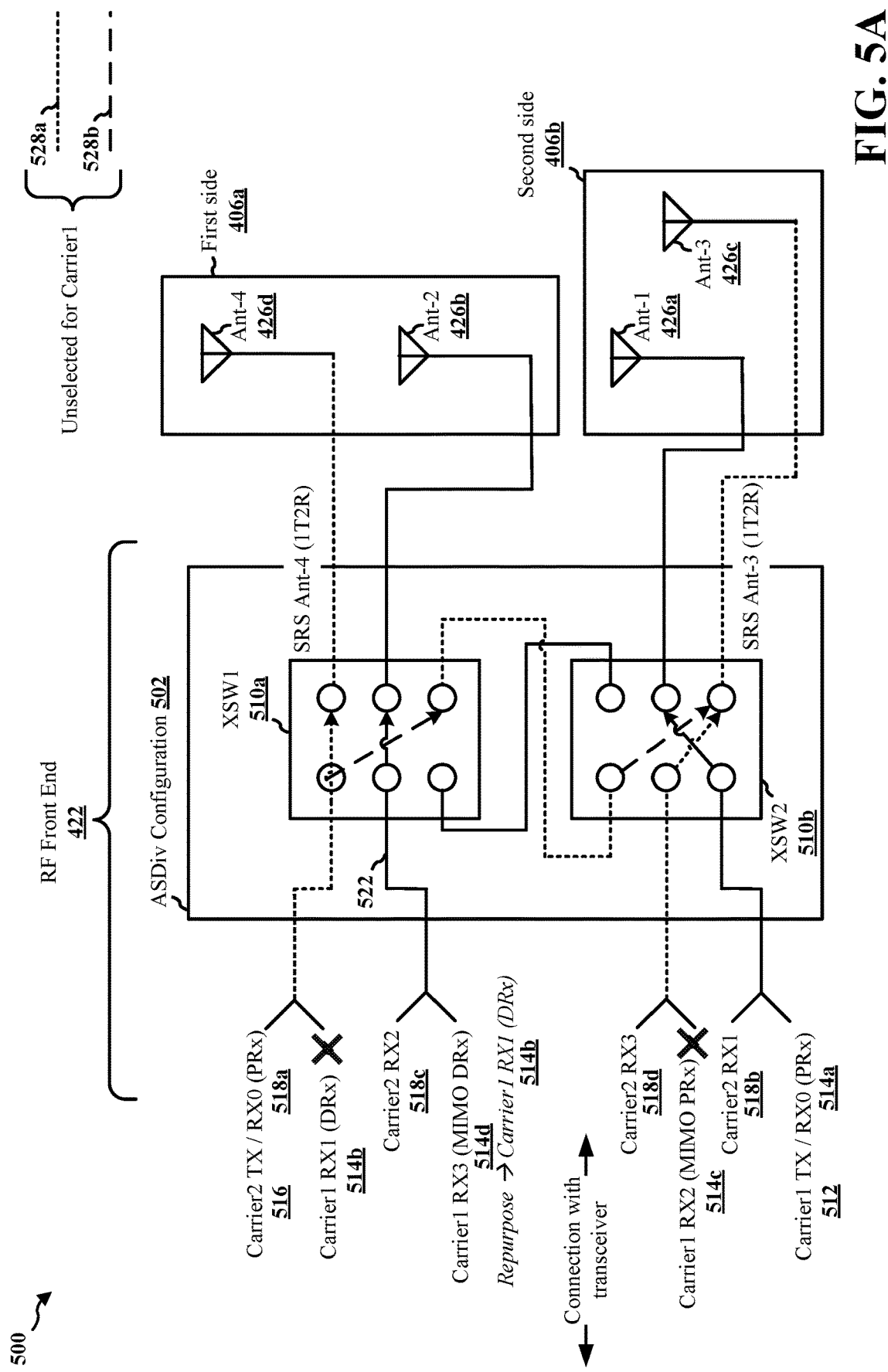
FIG. 5A is a diagram illustrating an example antenna switching diversity configuration that a UE may implement to reduce or avoid interruption or blanking on one carrier from another carrier in some antenna switching scenarios.
Figure 5B:
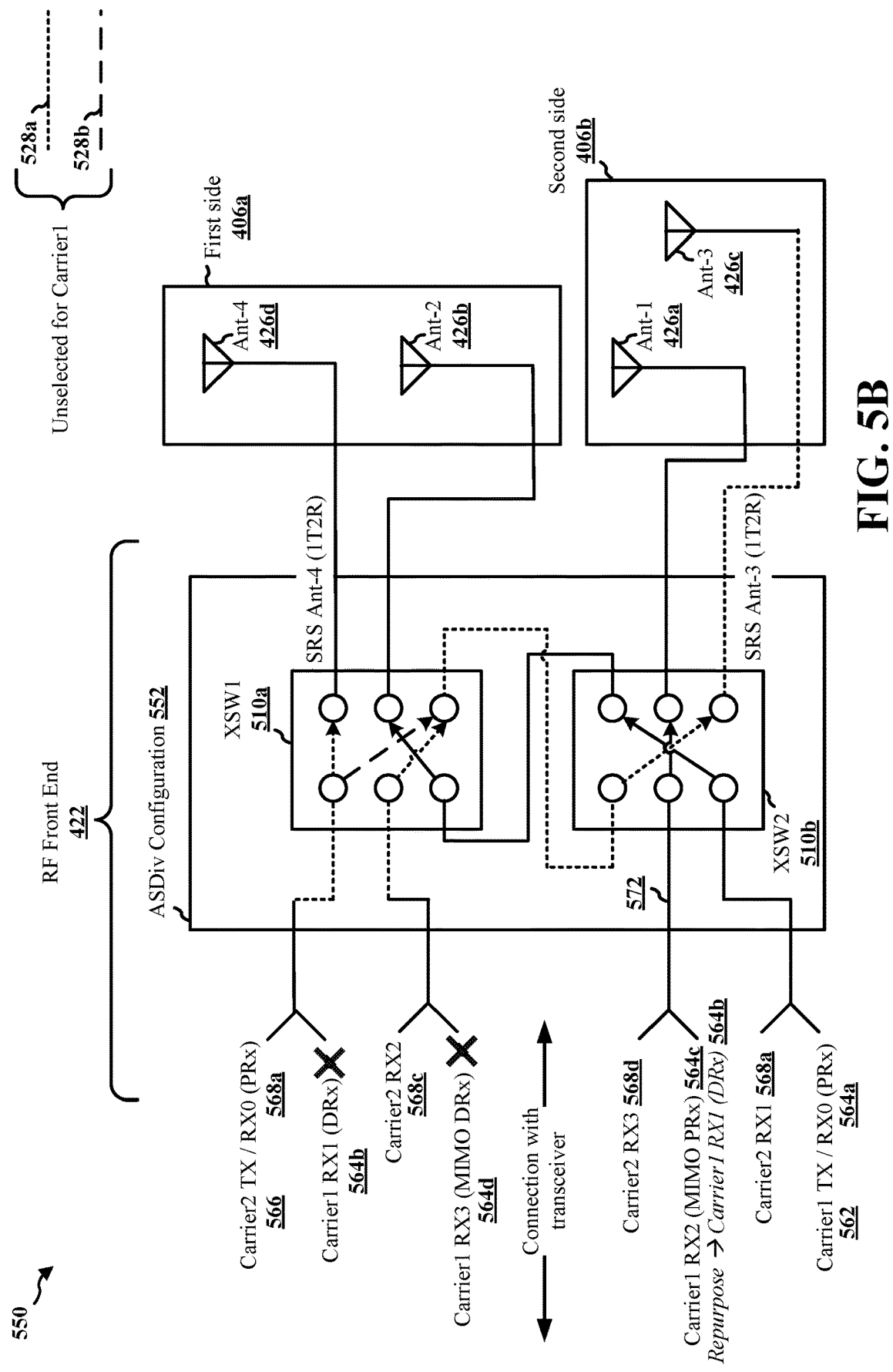
FIG. 5B is a diagram illustrating another example antenna switching diversity configuration that a UE may implement to reduce or avoid interruption or blanking on one carrier from another carrier in some antenna switching scenarios.

Referring to FIGS. 5A and 5B, diagrams 500, 550 illustrate example ASDiv configurations 502, 552 that a UE may implement in order to reduce or avoid interruption or blanking on one carrier from another carrier in some antenna switching scenarios. In the context of FIG. 4, the RF front end 422 of the UE 404 may be set so that the various TX and RX chains for the first and second carriers 410a-b are consistent with either the illustrated first ASDiv configuration 502 or the second ASDiv configuration 552.

The UE 404 may include multiple TX and RX chains, which may be assigned to one of the first or second carriers 410a-b. For example, the UE 404 may include four respective RX chains for each of the first and second carriers 410a-b, and one respective TX chain for each of the first and second carriers 410a-b. Signaling that is transmitted and received on one the respective TX and RX chains may follow a corresponding one of the configured first carrier paths 512, 514a-d or the configured second carrier paths 516, 518a-d, e.g., depending upon which carrier the signaling is transmitted or received on and which RF chain is routed to one of the antennas 426a-d.

The RF front end 422 may include a set of switches (e.g., first and second cross-switches, XSW1 and XSW2) that may dictate the route that transmission signaling will traverse from a transceiver (or SDR) through the RF front end 422 and to one of the antenna 426a-d and that reception signaling will traverse from one of the antennas 426a-d through the RF front end 422 and a transceiver. If a path traverses more than one switch, the switches on that path may be regarded as cascaded switches.

For antenna diversity, RX chains of the UE 404 may be configured on multiple paths 514a-d. On the first carrier 410a, one RX chain of the UE 404 may be a primary receive (PRx) RX0 path 514a (e.g., line-of-sight (LOS) path) and another may be a diversity receive (DRx) RX1 path 514b. Similarly, the UE 404 may include a PRx RX0 path 518a through the RF front end 422 on the second carrier 410b, as well as other path(s) 518b-d for SRS antenna switching on the second carrier 410b. In some instances, the UE 404 may include paths on which MIMO signaling is configured, e.g., including a PRx MIMO RX2 path 514c and a DRx MIMO RX3 path 514d.

The UE may identify and select one or more paths that traverse the RF front end 422 for the first carrier 410a, which the UE 404 may evaluate to mitigate or avoid interruption or blanking on the first carrier 410*a* when sounding over (at least a portion of) the second carrier 410*b* (e.g., sounding with antenna switching). For instance, the UE may search across multiple (or even all possible) RF front end paths supported for the dual connectivity RF band combination. In so doing, the UE may identify the shortest RF front end path from RF transceiver (or SDR) to antenna cross-switches, e.g., on which the UE 404 may configure an RF path for the one RAT.

Potentially, this may involve hopping the RF chain across different possible RF front end paths to avoid cascaded cross-switching, as a path with only a single cross-switch may be preferable. For example, the UE 404 may examine potential routes for the RX1 path 514*b*, and the UE 404 may find that the routes 528*a*, 528*b* are unsuitable for RX1 path 514*b*. Rather, the UE 404 may find that a direct path to Ant-2 426*b* is available without conflicting with the paths of the second carrier 410*b* during 1T2R SRS antenna switching.

To that end, the UE 404 may the evaluate criteria associated with the ASDiv operations, upon which switching antennas may be based. For example, the UE 404 may group the antennas together (e.g., by antenna ID) based on the form factor of the UE 404, and the UE 404 may determine on which of the sides 406*a-b* the current TX path 512 of the first carrier 410*a* is configured. That is, the UE 404 may identify to which of the antennas 426*a-d* the TX path 512 is currently mapped. The UE 404 may evaluate criteria with respect to the TX path 512 according to which the transmitting along the TX path 512 should avoid interruption or blanking of SRS transmission on the second carrier 410*b* (or nearly so). For example, if the TX path 512 is mapped to the same one of the antennas 426*a-b* that will be sounded during the 1T2R SRS transmission, then the UE 404 may determine that the TX path 512 fails to meet the criteria of avoiding interruption or blanking of SRS transmission on the second carrier 410*b*. Therefore, the UE 404 may determine that the TX path 512 should be assigned to another antenna.

In some additional or alternative examples, the UE 404 may evaluate RF front end paths (e.g., at a sub-path level) to identify a RF front end path with which the UE 404 may reduce or minimize front end losses for an RX chain on the first carrier 410*a* (e.g., on an LTE carrier). The UE 404 may select and prioritize front end paths having the fewest number of cascaded cross-switches, which may include prioritizing the direct path 522 to Ant-2 426*b*. Correspondingly, the UE 404 may avoid front end paths that include more than one cross-switch (or more than one cross-switch per sub-path), such as the unselected route 528*b* that traverses both cross-switches 510*a-b*. That is, the UE 404 may prioritize the direct path 522 from a radio transceiver (or SDR) to a physical antenna Ant-2 426*b* via one cross-switch 510*a*. Therefore, the UE 404 may find some criteria to be fulfilled where a front end path having less than a threshold number of cascaded cross-switches is identified (e.g., the threshold may dictate that the number of cascaded switches be less than two or less than one) is identified. In the context of FIG. 5A, the UE 404 may find some criteria in which the threshold number of cascaded switches may not exceed one to be satisfied for each of the TX path 512, RX0 path 514*a*, and RX1 path 514*b* on the first carrier 410*a*, because none of these paths traverses a switch at both cross-switches 510*a*, 510*b*.

In another example of such criteria, a UE 404 may evaluate selection of an RF chain associated with SRS antenna switching on one carrier (e.g., NR carrier) for effects causing interruptions or blanking to signals on the other carrier (e.g., LTE TX signal). The UE 404 may select the RF chain that reduces or minimizes the unintentional interruptions or blanking on the other carrier. For example, the UE 404 may reassign the DRx RX1 path 514*b* away from the same route as the PRx RX0 path 518*a*/TX path 516 of the second carrier 410*b*, which the UE 404 may determine to have a relatively high likelihood of interrupting or blanking the DRx RX signal. Instead, the UE 404 may assign the DRx RX1 path 514*b* on the route of the MIMO DRx RX3 path 514*d* of the first carrier 410*a*. When so reassigned, the DRx RX1 path 514*b* may be on a direct path 522 to Ant-2 426*b*.

The UE 404 may jointly reconfigure or retune two or more paths of at least one of the first or second carriers 410*a-b* in order to avoid or reduce interruptions or blanking on one carrier (e.g., LTE carrier) with antenna switching diversity due to SRS antenna switching on the other carrier (e.g., NR carrier). For example, the RF front end analog paths of RX and/or TX chains on the first carrier 410*a* and the RX and/or TX paths on the second carrier 410*b* may be jointly reconfigured or retuned, which may allow the TX chain of one carrier (e.g., first carrier 410*a*) to be transitioned onto a TX antenna ASDiv configuration 502, e.g., in order to avoid interruptions or blanking caused by the other carrier (e.g., NR carrier).

In the illustrated example for the first ASDiv configuration 502, the UE 404 may deprioritize or remove some such paths, which may be less delay sensitive or than some RX paths 514*a-d*. For example, the UE 404 may assign the TX path 512 for the first carrier 410*a* on Ant-1 426*a* or the UE 404 may assign the TX path 512 of the first carrier 410*a* to the PRx RX0 path 514*a*. SRS on the second carrier 410*b* may be 1T2R on Ant-4 426*d* and ANT-3 426*c*.

The UE 404 may retune or reconfigure the DRx RX1 path 514*b* to the direct path 522, which may replace the MIMO DRx signal on the RX3 path 514*d*. In other words, signaling received on Ant-2 426*b* on the first carrier 410*a* may be decoded and processed as DRx signaling or multipath component related to the PRx signaling or multipath (LOS) component on Ant-1 426*b*. Thus, the UE 404 may use two RX paths—the RX0 path 514*a* to Ant-1 426*a* and the RX1 path 514*b* to Ant-4 426*c*—to receive signaling at different sides 406*a-b* of the UE 404 so that diversity is still achieved on the first carrier 410*a* during SRS antenna switching on the second carrier 410*b*. The TX path 512 on the first carrier 410*a* may be configured to follow the same route as the PRx RX0 path 514*a* on the first carrier 410*a*, which may avoid collisions during SRS transmission or other signaling reception on Ant-3 426*c* and Ant-4 416*d*. Accordingly, the 1T2R SRS antenna switching on the second carrier 410*b* likewise may avoid some or all interruptions or blanking when sounding on Ant-4 426*d* and Ant-3 426*c*.

FIG. 5B illustrates another example ASDiv configuration 552 that the UE 404 may implement to reduce or avoid interruption or blanking on one carrier from another carrier in some antenna switching scenarios. As described above, the UE 404 may evaluate some criteria related to antenna switching upon which an antenna configuration may be based in order to mitigate interruption or blanking in such antenna switching scenarios.

In the diagram 550 of FIG. 5B, the UE 404 may find some criteria to be fulfilled where an RF chain does not cause interruption or blanking on one carrier (e.g., LTE carrier) when used for sounding (e.g., SRS transmission) on the other carrier (e.g., NR carrier). In some aspects, the UE 404 may determine that a current RF antenna configuration on one carrier (e.g., LTE carrier) may be reconfigured from one side to another side of the UE 404—e.g., such that communication via antennas at one of the sides 406a-b will instead occur via antennas at the other one of the side 406a-b.

The UE 404 may find the aforementioned criteria to be fulfilled where a TX chain does not cause interruption or blanking on one carrier (e.g., LTE carrier) when used for sounding (e.g., SRS transmission) on the other carrier (e.g., NR carrier other front end paths for a TX chain of one carrier (e.g., LTE carrier). The UE 404 may identify some or all RX (or non-TX antenna) paths that avoid or reduce interruptions or blanking caused by the other carrier (e.g., NR carrier). The UE 404 may identify such RX paths using information specifying some or all possible paths (e.g., hardware paths) between RF transceiver and one of the antenna 426a-d, which may include identifying sub-paths between RF transceiver and one of the antenna cross-switches 510a-b, and potentially, sub-paths between antenna cross-switches 510a-b and one of the antennas 426a-d.

The UE 404 may search for RF front end paths between the transceiver (or SDR) and antenna cross-switches 510a-b that were not used in a prior ASDiv configuration 502 when evaluating RF front end paths for the ASDiv configuration 552. Illustratively, the UE 404 may search for RF front end paths between the transceiver (or SDR) and antenna cross-switches 510a-b that were not used in the prior ASDiv configuration 502, when evaluating RF front end paths to move to one of the antennas 426a-d on the other one of the sides 406a-b of the UE 404. Thus, the UE 404 may determine that the DRx RX1 path 564b on the first carrier 410a is to be configured on the second side 406b of the UE 404, instead of the first side 406a, in order to avoid interruption or blanking when some or all of the antennas 426a-d are sounded on the second carrier 410b. However, the UE 404 may determine that with such configuration, the TX path 562 and the PRx RX0 path 564a on the first carrier 410a are to be configured on the first side 406a. This configuration of the TX path 562 and the PRx RX0 path 564a on the first carrier 410a may traverse two cross-switches 510a-b. The UE 404 may regard this traversal as acceptable for avoidance of interruption or blanking when some or all of the antennas 426a-d are sounded with antenna switching on the second carrier 410b.

The UE 404 may jointly reconfigure or retune two or more paths of at least one of the first or second carriers 410a-b in order to avoid or reduce interruptions or blanking on one carrier (e.g., first carrier 410a) with antenna switching diversity due to SRS antenna switching on the other carrier (e.g., second carrier 410b). According to the ASDiv configuration 552, for example, the UE 404 may configure the TX path 562 and the PRx RX0 path 564a on Ant-2 426b for the first carrier 410a. The DRx RX1 path 564b for the first carrier 410a may be configured on Ant-1 426a on the second side 406b, which configures the RX1 path 564b away from the first side 406a of the UE 404. In the illustrated example for the first ASDiv configuration 552, however, the UE 404 may retune or reconfigure the DRx RX1 path 564b to the direct path 572, which may reduce some signal loss and/or error rate. Therefore, the MIMO PRx signal on the RX2 path 564c may be repurposed (e.g., reused or replaced) so that signaling received on Ant-1 426a on the first carrier 410a may be decoded and processed as DRx signaling or multipath component related to the PRx signaling or multipath (LOS) component on Ant-2 426a. Thus, the UE 404 may use two RX paths—the RX0 path 564a to Ant-2 426b and the RX1 path 564b to Ant-1 426a—to receive signaling at different sides 406a-b of the UE 404 so that diversity is still achieved on the first carrier 410a during SRS antenna switching on the second carrier 410b.

SRS on the second carrier 410b may be 1T2R on Ant-4 426d and ANT-3 426c. Accordingly, the 1T2R SRS antenna switching on the second carrier 410b likewise may avoid some or all interruptions or blanking when sounding on Ant-4 426d and Ant-3 426c. The TX path 562 on the first carrier 410a may be configured to follow the same route as the PRx RX0 path 564a on the first carrier 410a, which may avoid collisions during SRS transmission or other signaling reception on Ant-3 426c and Ant-4 426d.

Figure 6A:
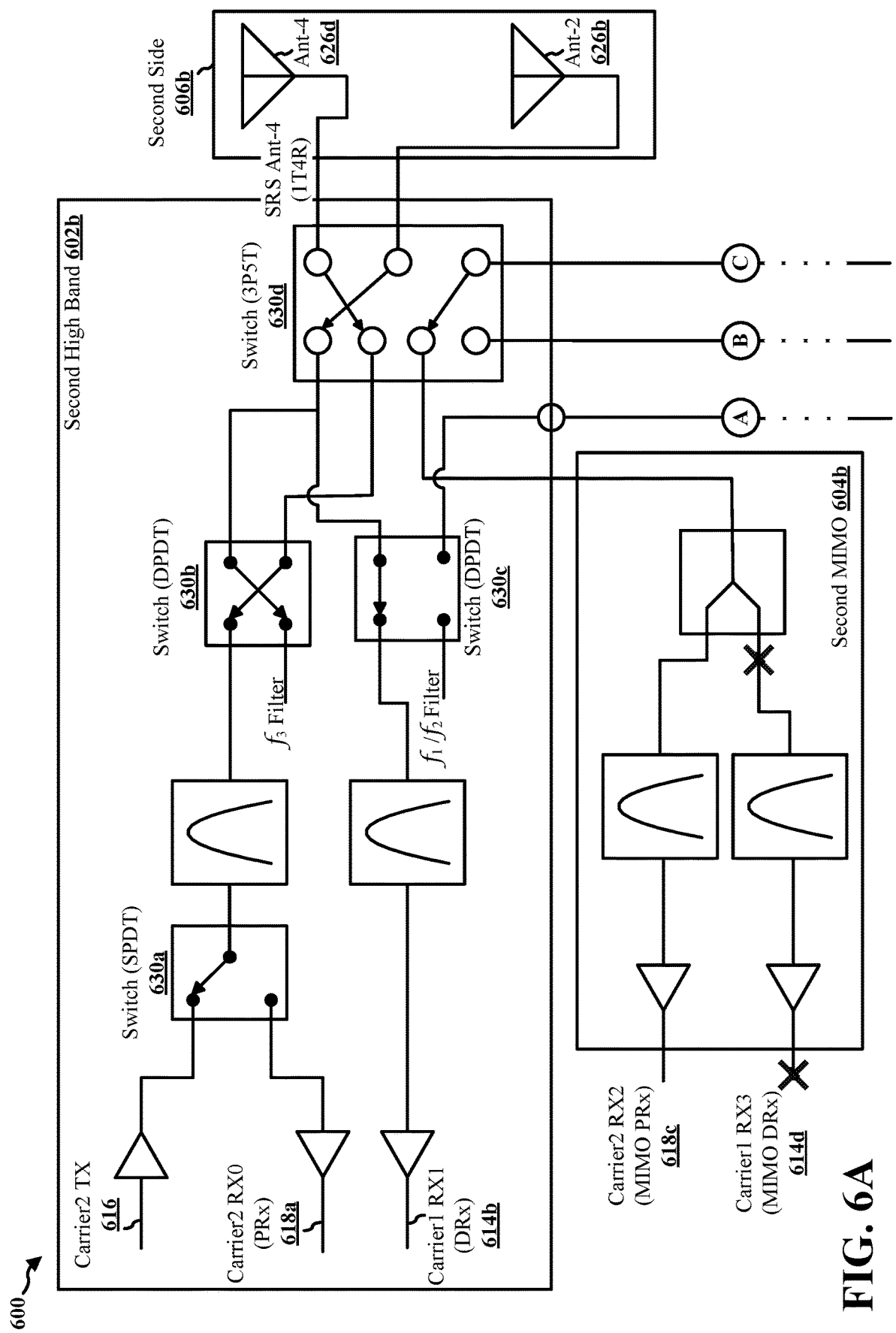
FIGS. 6A and 6B are diagrams illustrating an example implementation of an antenna switching diversity configuration on communication paths that traverse high-band and multiple-input multiple-output (MIMO) components of an RF front end.
Figure 6B:
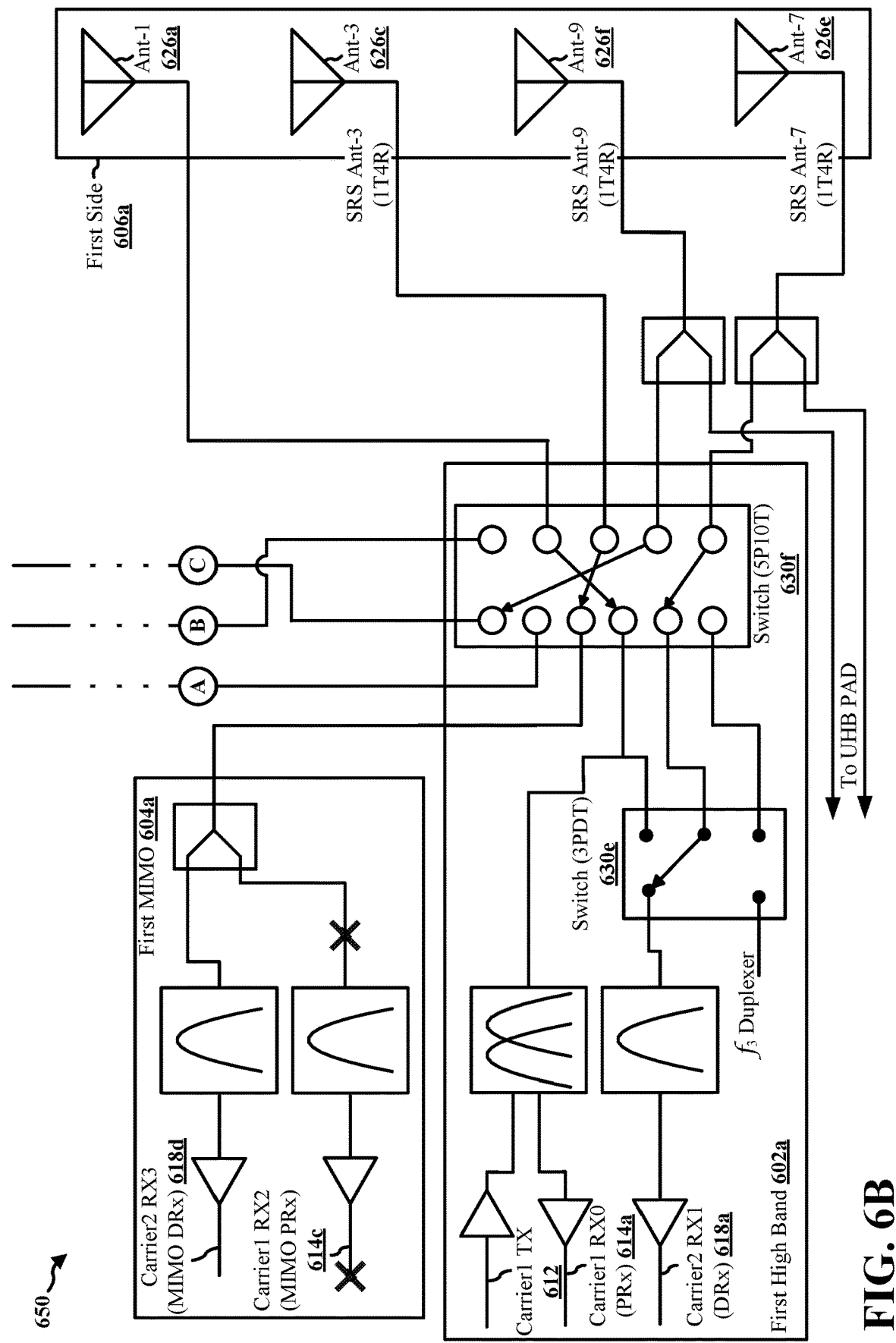

FIGS. 6A and 6B are diagrams 600, 650 illustrating an example implementation of an ASDiv configuration on communication paths 612, 614a-d, 616, 618a-d that traverse high-band and MIMO components 602a-b, 604a-b of an RF front end. In the illustrated aspect, a UE may be configured with six antennas 626a-f. The UE may identify a current or active antenna configuration, such as a current TX antenna configuration for the carrier of one RAT (e.g., LTE TX antenna configuration). The UE may determine an antenna configuration or location with respect to the device form factor, such as by determining that an antenna is on a panel at the bottom of the UE or at the top of the UE. For example, the UE may group antennas (e.g., by antenna ID) according to which side of the UE the antenna is most proximate (e.g., on a panel at the bottom of the UE or at the top of the UE). Accordingly, the UE may group together a first set of antennas 626a, 626c, 626e-f on a first side 606a of the UE and may group together a second set of antennas 626b, 626d on a second side 606b of the UE.

In FIGS. 6A and 6B, the first ASDiv configuration 502 described with respect to FIG. 5A may be implemented. However, SRS transmission in a second carrier (e.g., NR carrier) may be configured as 1T4R, e.g., as the UE may include six antennas instead of four. Regardless, TX and/or RX paths 612, 614a-d on the first carrier (e.g., LTE carrier) may be configured for antenna switching diversity in such a way that reduces or avoids interruptions or blanking during the 1T4R SRS antenna switching on the second carrier, or vice versa.

To that end, the UE may the evaluate criteria associated with the ASDiv operations, upon which switching antennas may be based. For example, the UE may group the antennas together (e.g., by antenna ID) based on the form factor of the UE, and the UE may determine on which of the sides 606a-b the current TX path 612 of the first carrier is configured. That is, the UE may identify to which of the antennas 626a-f the TX path 612 is currently mapped. The UE may evaluate criteria with respect to the TX path 612 according to which the transmitting along the TX path 612 should avoid interruption or blanking of SRS transmission on the second carrier (or nearly so). For example, if the TX path 612 is mapped to the same one of the antennas 426a-b that will be sounded during the 1T2R SRS transmission, then the UE may determine that the TX path 612 fails to meet the criteria of avoiding interruption or blanking of SRS transmission on the second carrier. Therefore, the UE may determine that the TX path 612 should be assigned to another antenna.

In some other examples, the UE may evaluate RF front end paths (e.g., at a sub-path level) to identify a RF front end path with which the UE may reduce or minimize front end losses for an RX chain on the first carrier (e.g., on an LTE carrier) and/or the second carrier. The UE may select and prioritize front end paths having the fewest number of cross-switches 630a-f in a cascaded arrangement. However, with such antenna complexity, traversal of some of the cross-switches 630a-f in a cascaded arrangement may be unavoidable.

Different ones of the criteria may be differently weighted. Therefore, if two are in conflict (e.g., an RF path meets one criteria and not the other), then the UE may determine which of the criterion is of the greater weight and so should be applied.

According to such criteria, the UE may jointly reconfigure or retune two or more paths of at least one of the first or second carriers in order to avoid or reduce interruptions or blanking on one carrier (e.g., LTE carrier) with antenna switching diversity due to SRS antenna switching on the other carrier (e.g., NR carrier). For example, the RF front end analog paths of RX and/or TX chains on the first carrier and the RX and/or TX paths on the second carrier may be jointly reconfigured or retuned, which may allow the TX chain of one carrier (e.g., first carrier) to avoid interruptions or blanking caused by the other carrier (e.g., NR carrier).

In the illustrated example, the UE may tune or configure 1T4R SRS antenna switching on the second carrier on Ant-7 626e, Ant-9 626f, and Ant-3 626c at the first side 606a of the UE. Further, the UE may tune or configure 1T4R SRS antenna switching on the second carrier on Ant-4 626d at the second side 606b of the UE.

Some paths may traverse filters, duplexers, and the like. For example, TX paths through the three-poll double-poll (3PDT) switch 630e may be isolated from RX paths, and vice versa based on the $f_3$ duplexer (e.g., $f_3$ may be equal to the B7 Band). In another example, RF paths through the double-poll double-throw (DPDT) switches 630b-c may have the $f_3$ band filtered out (e.g., $f_3$ may be equal to the B7 Band) by the first DPDT switch 630b or may have the $f_1$ and/2 bands filtered out (e.g., $f_1$ may be equal to the B34 Band and $f_2$ may be equal to the B39 Band) by the second DPDT switch 630c.

The UE may jointly turn or configure the TX path 612 and the RX0 path 614a on the first carrier at Ant-1 626a. These paths 612, 614a may only traverse on five-poll ten-throw (5P10T) switch 630f, which the UE may determine to satisfy the criteria specifying a ceiling threshold for the number of switches to traversed by an RF path. Accordingly, the UE may transmit high-band signaling on the first carrier at Ant-1 626a on the first side 606a of the UE. In addition, the UE may receive the PRx component of a high-band multipath signal at Ant-1 626a on the first side 606a of the UE. For some diversity, the UE may receive DRx component of the high-band multipath signal at Ant-2 626b on the second side 606b of the UE. Therefore, the UE may avoid interruptions or blanking caused by 1T4R SRS antenna switching on the second carrier by using two $R_x$ paths configured on different UE sides, which may provide sufficient diversity to receive signaling on the first carrier in 1T4R SRS antenna switching on the second carrier.

According to the first ASDiv configuration 502 in the context of 1T4R SRS transmission, the UE may deactivate or prohibit the MIMO components on the first carrier. That is, the UE may not receive PRx and DRx MIMO components on the R2 and R3 paths 614c-d. Instead, the PRx and DRx MIMO components of the second carrier may be received on the RX2 and RX3 paths 618c-d, e.g., on Ant-9 626f and Ant-3 626c, respectively, while interruptions or blanking from the first carrier is avoided.

Figure 7A:
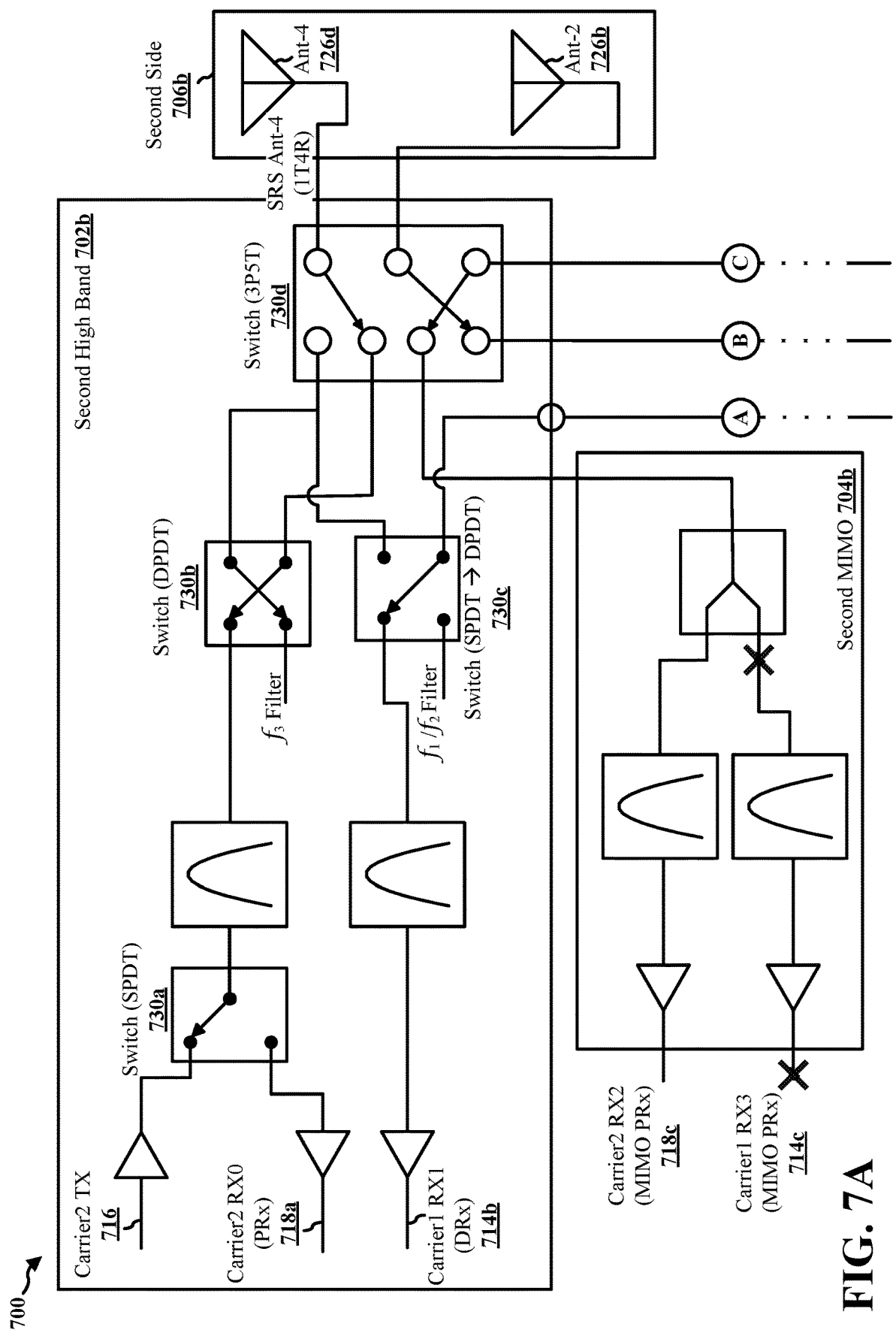
FIGS. 7A and 7B are diagrams illustrating another example implementation of an antenna switching diversity configuration on communication paths that traverse high-band and MIMO components of an RF front end.
Figure 7B:
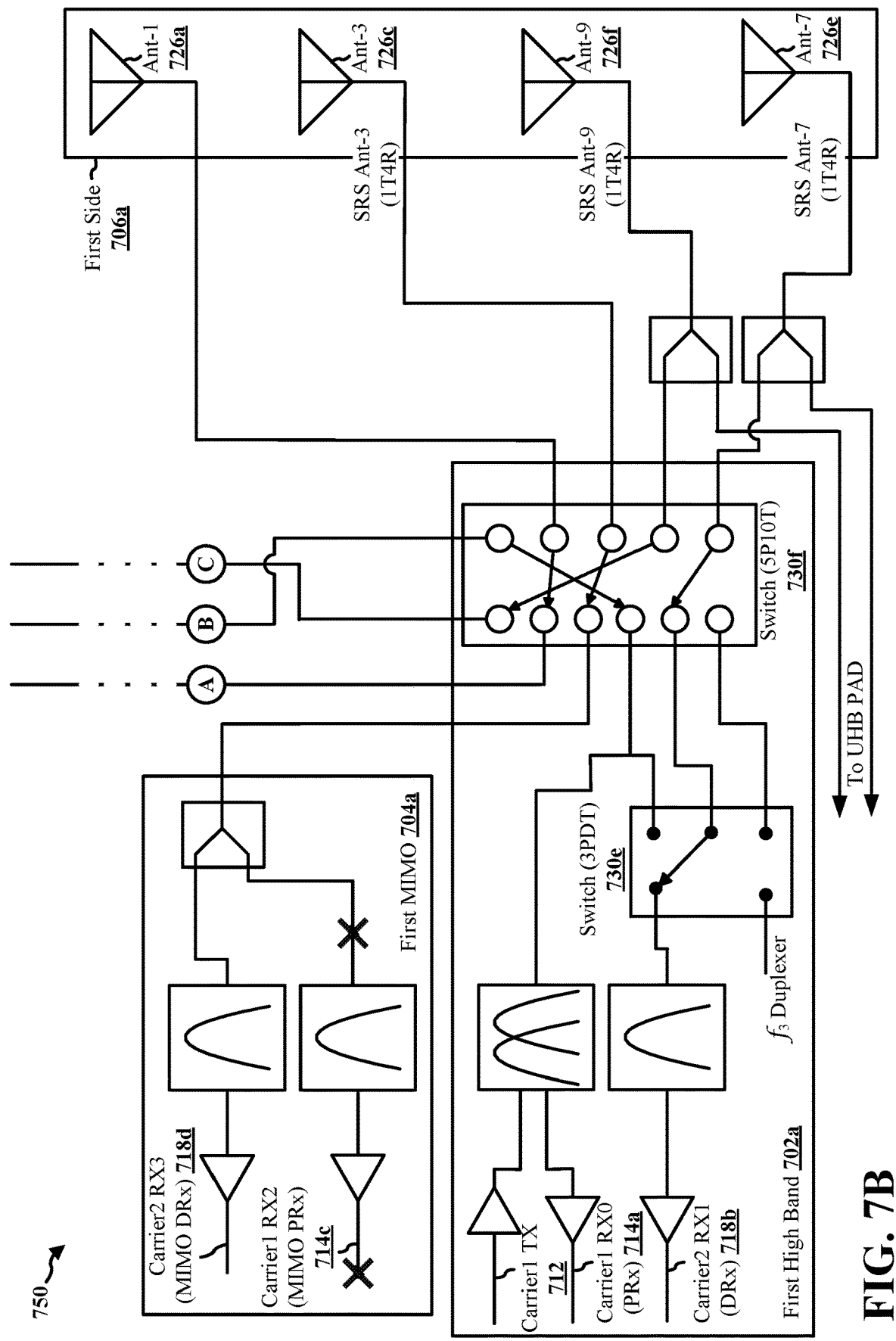

FIGS. 7A and 7B are diagrams 700, 750 illustrating an example implementation of an ASDiv configuration on communication paths 712, 714a-d, 716, 718a-d that traverse high-band and MIMO components 702a-b, 704a-b of an RF front end. In the illustrated aspect, a UE may be configured with six antennas 726a-f. The UE may identify a current or active antenna configuration, such as a current TX antenna configuration for the carrier of one RAT (e.g., LTE TX antenna configuration). The UE may determine an antenna configuration or location with respect to the device form factor, such as by determining that an antenna is on a panel at the bottom of the UE or at the top of the UE. For example, the UE may group antennas (e.g., by antenna ID) according to which side of the UE the antenna is most proximate (e.g., on a panel at the bottom of the UE or at the top of the UE). Accordingly, the UE may group together a first set of antennas 726a, 726c, 726e-f on a first side 706a of the UE and may group together a second set of antennas 726b, 726d on a second side 706b of the UE.

In FIGS. 7A and 7B, the second ASDiv configuration 552 described with respect to FIG. 5B may be implemented. However, SRS transmission in a second carrier (e.g., NR carrier) may be configured as 1T4R, e.g., as the UE may include six antennas instead of four. Regardless, TX and/or RX paths 712, 714a-d on the first carrier (e.g., LTE carrier) may be configured for antenna switching diversity so as to reduce or avoid interruptions or blanking during the 1T4R SRS antenna switching on the second carrier, or vice versa.

To that end, the UE may the evaluate criteria associated with the ASDiv operations, upon which switching antennas may be based. For example, the UE may evaluate RF front end paths (e.g., at a sub-path level) to identify a RF front end path with which the UE may reduce or minimize front end losses for an RX chain on the first carrier (e.g., on an LTE carrier). The UE may select and prioritize front end paths having the fewest number of cross-switches 730a-f in a cascaded arrangement. However, with such antenna complexity, traversal of some of the cross-switches 730a-f in a cascaded arrangement may be unavoidable.

In some instances, the UE may find some criteria to be fulfilled where an RF chain does not cause interruption or blanking on one carrier (e.g., LTE carrier) when used for sounding (e.g., SRS transmission) on the other carrier (e.g., NR carrier). In some aspects, the UE may determine that a current RF antenna configuration on one carrier (e.g., LTE carrier) may be reconfigured from one side to another side of the UE—e.g., such that communication via antennas at one of the sides 706a-b will instead occur via antennas at the other one of the side 706a-b.

The UE may find the aforementioned criteria to be fulfilled where a TX chain does not cause interruption or blanking on one carrier (e.g., LTE carrier) when used for sounding (e.g., SRS transmission) on the other carrier (e.g., NR carrier other front end paths for a TX chain of one carrier (e.g., LTE carrier), or vice versa. The UE may identify some or all RF (e.g., TX and/or RX) paths that avoid or reduce interruptions or blanking caused by the other carrier. The UE may identify such RF paths using information specifying some or all possible paths (e.g., hardware paths) between RF transceiver and one of the antennas 726a-f, which may include identifying sub-paths between RF transceiver and one of the antenna cross-switches 730a-f, and potentially, sub-paths between antenna cross-switches 730a-f and one of the antennas 726a-f. Thus, the UE may evaluate multiple sub-paths from a switch in combination with a single path to the switch.

The UE may search for RF front end paths between the transceiver (or SDR) and antenna cross-switches 710a-f that were not used in a prior ASDiv configuration when evaluating RF front end paths for the ASDiv configuration 552. Illustratively, the UE may search for RF front end paths between the transceiver (or SDR) and antenna cross-switches 730a-f that were not used in the prior ASDiv configuration, when evaluating RF front end paths to move to one of the antennas 726a-f on the other one of the sides 706a-b of the UE. Thus, the UE may determine that the DRx RX1 path 714b on the first carrier is to be configured on the first side 706a of the UE, instead of the second side 706b, in order to avoid interruption or blanking when some or all of the antennas 726a-f are sounded on the second carrier. However, the UE may determine that with such configuration, the TX path 712 and the PRx RX0 path 714a on the first carrier are to be configured on the second side 706b. This configuration of the TX path 712 and the PRx RX0 path 714a on the first carrier may traverse at least two crossswitches 730d, 730f, which are cascaded according to such paths. The UE may regard this traversal as acceptable for avoidance of interruption or blanking when some or all of the antennas 726a-f are sounded with antenna switching on the second carrier.

The UE may jointly reconfigure or retune two or more paths of at least one of the first or second carriers in order to avoid or reduce interruptions or blanking on one carrier (e.g., first carrier) with antenna switching diversity due to SRS antenna switching on the other carrier (e.g., second carrier). According to the ASDiv configuration 552, for example, the UE may configure the TX path 712 and the PRx RX0 path 714a on Ant-2 726b for the first carrier.

The DRx RX1 path 714b for the first carrier may be configured on Ant-1 726a on the first side 706a, which configures the RX1 path 714b away from the second side 706b of the UE. Thus, the UE may use two RX paths—the RX0 path 714a to Ant-2 726b and the RX1 path 714b to Ant-1 726a—to receive signaling at different sides 706a-b of the UE so that diversity is still achieved on the first carrier during SRS antenna switching on the second carrier.

SRS on the second carrier may be 1T4R on Ant-4 726d, Ant-3 726c, Ant-9 726f, and Ant-7 726e. Accordingly, the 1T4R SRS antenna switching on the second carrier likewise may avoid some or all interruptions or blanking when sounding on Ant-4 726d, Ant-3 726c, Ant-9 726f, and Ant-7 726e. The TX path 712 on the first carrier may be configured to follow the same route as the PRx RX0 path 714a on the first carrier, which may avoid collisions during SRS transmission or other signaling reception on Ant-4 726d, Ant-3 726c, Ant-9 726f, and Ant-7 726e.

Accordingly, the UE may transmit high-band signaling on the first carrier at Ant-2 726b on the second side 706b of the UE. In addition, the UE may receive the PRx component of a high-band multipath signal at Ant-2 726b on the second side 706b of the UE. For some diversity, the UE may receive DRx component of the high-band multipath signal at Ant-1 726a on the first side 706a of the UE. Therefore, the UE may avoid interruptions or blanking caused by 1T4R SRS antenna switching on the second carrier by using two $R_x$ paths configured on different UE sides, which may provide sufficient diversity to receive signaling on the first carrier in 1T4R SRS antenna switching on the second carrier.

According to the first ASDiv configuration 502 in the context of 1T4R SRS transmission, the UE may deactivate or prohibit the MIMO components on the first carrier. That is, the UE may not receive PRx and DRx MIMO components on the R2 and R3 paths 714c-d. Instead, the PRx and DRx MIMO components of the second carrier may be received on the RX2 and RX3 paths 718c-d, e.g., on Ant-9 726f and Ant-3 726c, respectively, while interruptions or blanking from the first carrier is avoided.

Figure 8:
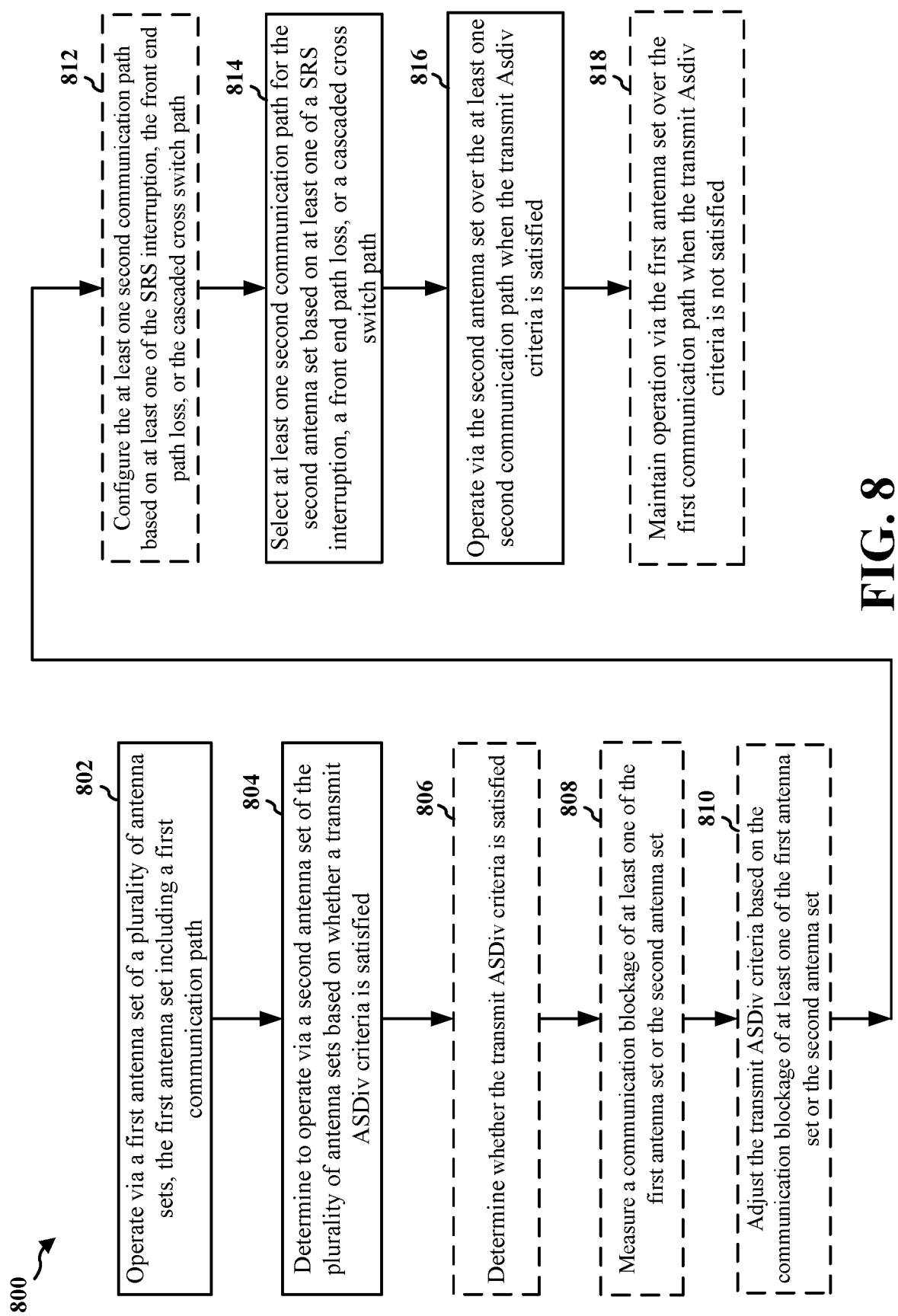
FIG. 8 is a flowchart of a method of wireless communication by a UE.

FIG. 8 is a flowchart 800 of a method of wireless communication. The method may be performed by a UE or a component of a UE (e.g., the UE 104, the UE 350, the UE 404, or another UE) or the apparatus (e.g., the apparatus 902 or a processing system, which may include the memory 360 and which may be the entire UE or a component of the UE, such as the TX processor 368, the RX processor 356, or the controller/processor 359). According to various aspects of the present disclosure one or more of the illustrated operations may be transposed, omitted, and/or contemporaneously performed, e.g., as illustrated with dashed lines. The methods described herein can provide a number of benefits, such as improving communication signaling, resource utilization, or power savings.

At 802, the UE may operate via a first antenna set of a plurality of antenna sets, the first antenna set including a first communication path. For example, the UE may transmit or receive signaling on one or more antennas that is each connected to a respective RF chain. In some aspects, the UE may be operating in an ENDC mode and/or NR dual connectivity (NRDC) mode (e.g., in which one connectivity portion may be on a one RAT and another connectivity portion may be on another RAT, but the UE directly communicates on the one RAT and not the other RAT). For example, referring to FIGS. 4 through 7B, the UE 404 may operate with the antennas being configured according to a configuration that is neither the first ASDiv configuration 502 nor the second ASDiv configuration 552.

In some instances, the at least one second communication path may be at least one TX path and/or at least one RX path, as described herein. Further, the first antenna set may correspond to one side of the UE and the second antenna set may correspond to a different side of the UE.

At 804, the UE may determine to operate via a second antenna set of the plurality of antenna sets based on whether a ASDiv criteria is satisfied. For example, the UE may determine whether an RF chain of one carrier is mapped to the same antenna that is to be sounded over by another carrier. If so, the UE may determine that the RF path of the one carrier is to be reconfigured onto a different path that is unlikely to cause or experience interruption or blanking when the other antennas are sounded on the other carrier. For example, referring to FIGS. 4 through 7B, the UE 404 may operate with the antennas being configured according to either the first ASDiv configuration 502 or the second ASDiv configuration 552 based on whether some or all criteria is fulfilled.

At 806, the UE may determine whether the transmit ASDiv criteria is satisfied. The UE may hop one or more RF chains along different RF paths from transceiver to antenna. The UE may identify the RF path having the fewest number of switch (or fewest cascaded switches), e.g., on the other side of the UE. The UE may compare the number of hops to a For example, referring to FIGS. 4 through 7B, the UE 404 may determine whether the transmit ASDiv criteria is satisfied for implementation of either the first ASDiv configuration 502 or the second ASDiv configuration 552.

At 808, the UE may measure a communication blockage of at least one of the first antenna set or the second antenna set. For example, referring to FIGS. 4 through 7B, the UE 404 may receive one or more pilot signals, and the UE may measure a value indicative of channel power or channel quality. For example, referring to FIGS. 4 through 7B, the UE 404 may measure a communication blockage of at least one of the first antenna set on the first side 406a, 606a, 706a or the second antenna set of the second side 406b, 606b, 706b.

At 810, the UE may adjust the ASDiv criteria based on the communication blockage of at least one of the first antenna set or the second antenna set. For example, the UE may determine that a measurement indicative of channel quality on one side of the UE does not satisfy (e.g., meet or exceed) a threshold for transmitting, and so the UE may adjust the ASDiv criteria to (temporarily) remove the criteria related to transmitting on one carrier from a different side of the UE than sounding on another carrier. For example, referring to FIGS. 4 through 7B, the UE 404 may adjust the ASDiv criteria based on the communication blockage of at least one of the first antenna set on the first side 406*a*, 606*a*, 706*a* or the second antenna set of the second side 406*b*, 606*b*, 706*b*.

At 812, the UE may configure the at least one second communication path based on at least one of the SRS interruption, the front end path loss, or the path having cascaded cross-switches. For example, the UE may select a first sub-path that is traversed to one or more switches from a transceiver (or SDR), and the UE may select at least one second sub-path that is traversed from the one or more switches to the antennas. For example, referring to FIGS. 4 through 7B, the UE 404 may configure the at least one second communication path (e.g., the direct path 522, the direct path 572) based on cascaded cross-switches on other paths.

At 814, the UE may select at least one second communication path for the second antenna set based on at least one of an interruption associated with sounding antennas, a front end path loss, or an RF path having cascaded cross-switches. In some aspects, the at least one second communication path may be selected based on at least one of: reducing or avoiding the front end path loss, reducing or avoiding SRS interruption, or reducing or avoiding use of a communication path that includes more than a threshold number of cascaded cross-switches. For example, referring to FIGS. 4 through 7B, the UE 404 may configure the at least one second communication path (e.g., the direct path 522, the direct path 572) based on cascaded cross-switches on other paths. Specifically, the UE 404 may configure communication paths according to the first ASDiv configuration 502 or the second ASDiv configuration 552.

At 816, the UE may operate via the second antenna set over the at least one second communication path when the transmit ASDiv criteria is satisfied. In some aspects, the UE may transmit or receive signaling on one or more antennas that is each connected to a respective RF chain via the at least one second communication path. For example, referring to FIGS. 4 through 7B, the UE 404 may operate with the antennas being configured according to a configuration that is either the first ASDiv configuration 502 or the second ASDiv configuration 552.

At 818, the UE may maintain operation via the first antenna set over the first communication path when the ASDiv criteria is not satisfied. In some aspects, the UE may periodically reevaluate criteria while operating with an ASDiv configuration, and where the criteria is still met, the UE may refrain from reconfiguring communication paths differently from the ASDiv configuration. For example, referring to FIGS. 4 through 7B, the UE 404 may maintain operation with the antennas being configured according to a configuration that is either the first ASDiv configuration 502 or the second ASDiv configuration 552 when the ASDiv criteria is not satisfied.

Figure 9:
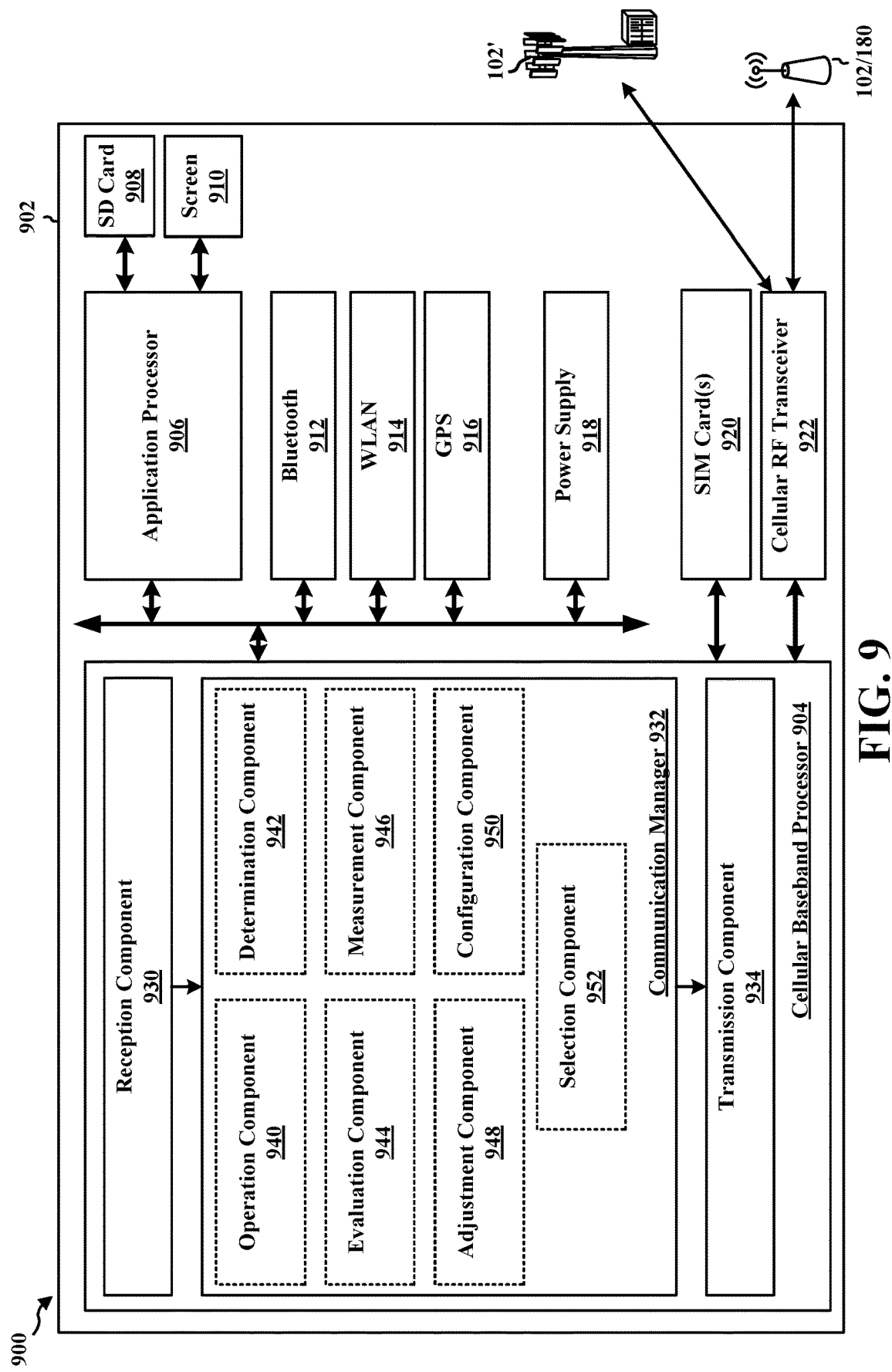
FIG. 9 is a diagram illustrating an example of a hardware implementation for an example apparatus.

FIG. 9 is a diagram 900 illustrating an example of a hardware implementation for an apparatus 902. The apparatus 902 may be a UE or similar device, or the apparatus 902 may be a component of a UE or similar device. The apparatus 902 may include a cellular baseband processor 904 (also referred to as a modem) and/or a cellular RF transceiver 922, which may be coupled together and/or integrated into the same package or module.

In some aspects, the apparatus 902 may accept or may include one or more subscriber identity modules (SIM) cards 920, which may include one or more integrated circuits, chips, or similar circuitry, and which may be removable or embedded. The one or more SIM cards 920 may carry identification and/or authentication information, such as an international mobile subscriber identity (IMSI) and/or IMSI-related key(s). Further, the apparatus 902 may include one or more of an application processor 906 coupled to a secure digital (SD) card 908 and a screen 910, a Bluetooth module 912, a wireless local area network (WLAN) module 914, a Global Positioning System (GPS) module 916, and/or a power supply 918.

The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904.

In the context of FIG. 3, the cellular baseband processor 904 may be a component of the UE 350 and may include the memory 360 and/or at least one of the TX processor 368, the RX processor 356, and/or the controller/processor 359. In one configuration, the apparatus 902 may be a modem chip and/or may be implemented as the baseband processor 904, while in another configuration, the apparatus 902 may be the entire UE (e.g., the UE 350 of FIG. 3) and may include some or all of the abovementioned modules, components, and/or circuitry illustrated in the context of the apparatus 902. In one configuration, the cellular RF transceiver 922 may be implemented as at least one of the transmitter 354TX and/or the receiver 3 54RX.

The reception component 930 may be configured to receive signaling on a wireless channel, such as signaling from a base station 102/180 or UE 104. The transmission component 934 may be configured to transmit signaling on a wireless channel, such as signaling to a base station 102/180 or UE 104. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission.

The communication manager 932 may include an operation component 940 that is configured to operate via a first antenna set of a plurality of antenna sets, the first antenna set including a first communication path, e.g., as described in connection with 802 of FIG. 8. In some instances, the at least one second communication path may be at least one TX path and/or at least one RX path. Further, the first antenna set may correspond to one side of the apparatus 902 and the second antenna set may correspond to a different side of the apparatus 902.

The communication manager 932 may further include a determination component 942 that is configured to determine to operate via a second antenna set of the plurality of antenna sets based on whether a ASDiv criteria is satisfied, e.g., as described in connection with 804 of FIG. 8.

The communication manager 932 may further include an evaluation component 944 that is configured to determine whether the transmit ASDiv criteria is satisfied, e.g., as described in connection with 806 of FIG. 8.

The communication manager 932 may further include a measurement component 946 that is configured to measure a communication blockage of at least one of the first antenna set or the second antenna set, e.g., as described in connection with 808 of FIG. 8.

The communication manager 932 may further include an adjustment component 948 that is configured to adjust the ASDiv criteria based on the communication blockage of at least one of the first antenna set or the second antenna set, e.g., as described in connection with 810 of FIG. 8.

The communication manager 932 may further include a configuration component 950 that is configured to configure the at least one second communication path based on at least one of the SRS interruption, the front end path loss, or the path having cascaded cross-switches, e.g., as described in connection with 812 of FIG. 8.

The communication manager 932 may further include a selection component 952 that is configured to select at least one second communication path for the second antenna set based on at least one of an interruption associated with sounding antennas, a front end path loss, or an RF path having cascaded cross-switches, e.g., as described in connection with 814 of FIG. 8.

In some aspects, the operation component 940 may be further configured to operate via the second antenna set over the at least one second communication path when the transmit ASDiv criteria is satisfied, e.g., as described in connection with 816 of FIG. 8.

In some other aspects, the operation component 940 may be further configured to maintain operation via the first antenna set over the first communication path when the ASDiv criteria is not satisfied, e.g., as described in connection with 818 of FIG. 8.

The apparatus 902 may include additional components that perform some or all of the blocks, operations, signaling, etc. of the algorithm(s) in the aforementioned flowchart of FIG. 8. As such, some or all of the blocks, operations, signaling, etc. in the aforementioned flowchart of FIG. 8 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for operating via a first antenna set of a plurality of antenna sets, the first antenna set including a first communication path; means for determining to operate via a second antenna set of the plurality of antenna sets based on whether an ASDiv criteria is satisfied; means for selecting at least one second communication path for the second antenna set based on at least one of a SRS interruption, a front end path loss, or a path having cascaded cross-switches; and means for operating via the second antenna set over the at least one second communication path when the transmit ASDiv criteria is satisfied.

In one configuration, the apparatus 902, and in particular the cellular baseband processor 904, may further include means for maintaining operation via the first antenna set over the first communication path when the transmit ASDiv criteria is not satisfied.

In one configuration, the apparatus 902, and in particular the cellular baseband processor 904, may further include means for configuring the at least one second communication path based on at least one of the SRS interruption, the front end path loss, or the path having cascaded cross-switches.

In one configuration, the at least one second communication path is a RF front end path.

In one configuration, the apparatus 902, and in particular the cellular baseband processor 904, may further include means for measuring a communication blockage of at least one of the first antenna set or the second antenna set.

In one configuration, the apparatus 902, and in particular the cellular baseband processor 904, may further include means for adjusting the transmit ASDiv criteria based on the communication blockage of at least one of the first antenna set or the second antenna set.

In one configuration, the apparatus 902, and in particular the cellular baseband processor 904, may further include means for determining whether the transmit ASDiv criteria is satisfied.

In one configuration, the at least one second communication path is selected based on at least one of: minimizing the front end path loss, not resulting in the SRS interruption, or not utilizing the path having cascaded cross-switches.

In one configuration, the apparatus 902 is operating in an ENDC mode.

In one configuration, the apparatus 902 is operating in a NR dual connectivity (NRDC) mode, and a RAT of a first connectivity leg is NR and a RAT of a second connectivity leg is NR.

In one configuration, the at least one second communication path is at least one TX path or at least one RX path.

In one configuration, the SRS interruption is a SRS TX interruption or an SRS RX interruption.

In one configuration, the first antenna set corresponds to a top portion of the apparatus 902 and the second antenna set corresponds to a bottom portion of the apparatus 902.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method for wireless communication at a UE, including: operating via a first antenna set of a plurality of antenna sets, the first antenna set including a first communication path; determining to operate via a second antenna set of the plurality of antenna sets based on whether a transmit ASDiv criteria is satisfied; selecting at least one second communication path for the second antenna set based on at least one of a SRS interruption, a front end path loss, or a communication path having cascaded cross switches; and operating via the second antenna set over the at least one second communication path when the transmit ASDiv criteria is satisfied.

Example 2 is the method of Example 1, further including: maintaining operation via the first antenna set over the first communication path when the transmit ASDiv criteria is not satisfied.

Example 3 is the method of Example 1, further including: configuring the at least one second communication path based on at least one of the SRS interruption, the front end path loss, or the communication path having cascaded cross-switches.

Example 4 is the method of Example 3, wherein the at least one second communication path is a RF front end path.

Example 5 is the method of Example 1, further including: measuring a communication blockage of at least one of the first antenna set or the second antenna set.

Example 6 is the method of Example 5, further including: adjusting the transmit ASDiv criteria based on the communication blockage of at least one of the first antenna set or the second antenna set.

Example 7 is the method of Example 1, further including: determining whether the transmit ASDiv criteria is satisfied.

Example 8 is the method of Example 1, wherein the at least one second communication path is selected based on at least one of: reducing the front end path loss, reducing the SRS interruption, or not utilizing the path having cascaded cross-switches.

Example 9 is the method of Example 1, wherein the UE is operating in an ENDC mode.

Example 10 is the method of Example 1, wherein the UE is operating in an NRDC mode, wherein a RAT of a first connectivity leg is NR and a RAT of a second connectivity leg is NR.

Example 11 is the method of Example 1, wherein the at least one second communication path is at least one transmit path or at least one receive path.

Example 12 is the method of Example 1, wherein the SRS interruption is a SRS transmit interruption or an SRS receive interruption.

Example 13 is the method of Example 1, wherein the first antenna set corresponds to a top portion of the UE and the second antenna set corresponds to a bottom portion of the UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communication at a user equipment (UE), comprising:
operating via a first antenna set of a plurality of antenna sets over a first communication path, the first antenna set being located at a first position of the UE that is different from a second position of the UE at which a second antenna set is located;

selecting at least one second communication path for the second antenna set based on one or more antenna switching diversity (ASDiv) criteria that are associated with one or more cascaded cross-switches on at least one of the first communication path or the second communication path; and operating via the second antenna set over the at least one second communication path.

2. The method of claim 1, further comprising:
maintaining operation via the first antenna set over the first communication path when the ASDiv criteria is not satisfied.

3. The method of claim 1, further comprising:
configuring the at least one second communication path based on at least one of sounding reference signal (SRS) interruption, front end path loss, or a communication path having cascaded cross-switches.

4. The method of claim 3, wherein the at least one second communication path is a radio frequency (RF) front end path.

5. The method of claim 1, further comprising:
measuring a communication blockage of at least one of the first antenna set or the second antenna set.

6. The method of claim 5, further comprising:
adjusting the ASDiv criteria based on the communication blockage of at least one of the first antenna set or the second antenna set.

7. The method of claim 1, further comprising:
determining whether the ASDiv criteria is satisfied.

8. The method of claim 1, wherein the at least one second communication path is selected based on at least one of: reducing front end path loss, reducing SRS interruption, or avoiding paths having cascaded cross-switches.

9. The method of claim 1, wherein the UE is operating in an evolved universal terrestrial access network (E-UTRAN) new radio dual connectivity (ENDC) mode.

10. The method of claim 1, wherein the UE is operating in a new radio (NR) dual connectivity (NRDC) mode, wherein a radio access technology (RAT) of a first connectivity leg is NR and a RAT of a second connectivity leg is NR.

11. The method of claim 1, wherein the at least one second communication path is at least one transmit path or at least one receive path.

12. The method of claim 1, wherein the criteria is further associated with at least one of a sounding reference signal (SRS) interruption or a front end path loss.

13. The method of claim 1, wherein the first antenna set corresponds to a top portion of the UE and the second antenna set corresponds to a bottom portion of the UE.

14. An apparatus for wireless communication at a user equipment (UE), comprising:
a memory; and
at least one processor coupled to the memory and configured to:
operate via a first antenna set of a plurality of antenna sets over a first communication path, the first antenna set being located at a first position of the UE that is different from a second position of the UE at which a second antenna set is located;
select at least one second communication path for the second antenna set based on one or more antenna switching diversity (ASDiv) criteria that are associated with one or more cascaded cross-switches on at least one of the first communication path or the second communication path; and
operate via the second antenna set over the at least one second communication path.

15. The apparatus of claim 14, wherein the at least one processor is further configured to:
maintain operation via the first antenna set over the first communication path when the ASDiv criteria is not satisfied.

16. The apparatus of claim 14, wherein the at least one processor is further configured to:
configure the at least one second communication path based on at least one of SRS interruption, front end path loss, or a communication path having cascaded cross-switches.

17. The apparatus of claim 16, wherein the at least one second communication path is a radio frequency (RF) front end path.

18. The apparatus of claim 14, wherein the at least one processor is further configured to:
measure a communication blockage of at least one of the first antenna set or the second antenna set.

19. The apparatus of claim 18, wherein the at least one processor is further configured to:
adjust the ASDiv criteria based on the communication blockage of at least one of the first antenna set or the second antenna set.

20. The apparatus of claim 14, wherein the at least one processor is further configured to:
determine whether the ASDiv criteria is satisfied.

21. The apparatus of claim 14, wherein the at least one second communication path is selected based on at least one of: reduction of front end path loss, reduction of SRS interruption, or reduction of communication over paths having cascaded cross-switches.

22. The apparatus of claim 14, wherein the UE is operating in an evolved universal terrestrial access network (E-UTRAN) new radio dual connectivity (ENDC) mode.

23. The apparatus of claim 14, wherein the UE is operating in a new radio (NR) dual connectivity (NRDC) mode, wherein a radio access technology (RAT) of a first connectivity leg is NR and a RAT of a second connectivity leg is NR.

24. The apparatus of claim 14, wherein the at least one second communication path is at least one transmit path or at least one receive path.

25. The apparatus of claim 14, wherein the criteria is further associated with at least one of a sounding reference signal (SRS) interruption or a front end path loss.

26. The apparatus of claim 14, wherein the first antenna set corresponds to a top portion of the UE and the second antenna set corresponds to a bottom portion of the UE.

27. An apparatus for wireless communication at a user equipment (UE), comprising:
means for operating via a first antenna set of a plurality of antenna sets over a first communication path, the first antenna set being located at a first position of the UE that is different from a second position of the UE at which a second antenna set is located;
means for selecting at least one second communication path for the second antenna set based on one or more antenna switching diversity (ASDiv) criteria that are associated with one or more cascaded cross-switches on at least one of the first communication path or the second communication path; and
means for operating via the second antenna set over the at least one second communication path.

28. The apparatus of claim 27, further comprising:
means for maintaining operation via the first antenna set over the first communication path when the ASDiv criteria is not satisfied.

29. The apparatus of claim 27, further comprising:
means for configuring the at least one second communication path based on at least one of SRS interruption, front end path loss, or a communication path having cascaded cross-switches.

30. A non-transitory, computer-readable medium storing computer-executable code for wireless communication at a user equipment (UE), the code when executed by a processor cause the processor to:
operate via a first antenna set of a plurality of antenna sets over a first communication path, the first antenna set being located at a first position of the UE that is different from a second position of the UE at which a second antenna set is located;
select at least one second communication path for the second antenna set based on one or more antenna switching diversity (ASDiv) criteria that are associated with one or more cascaded cross-switches on at least one of the first communication path or the second communication path; and
operate via the second antenna set over the at least one second communication path.

* * * * *